(12) United States Patent
Cha et al.

(10) Patent No.: US 7,852,002 B2
(45) Date of Patent: Dec. 14, 2010

(54) FILTER AND PLASMA DISPLAY DEVICE THEREOF

(75) Inventors: Hong Rae Cha, Seoul (KR); Ji Hoon Sohn, Seoul (KR); Eun Seong Seo, Seoul (KR); Joon Kwon Moon, Seoul (KR); Woon Seo Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 11/952,889

(22) Filed: Dec. 7, 2007

(65) Prior Publication Data

US 2008/0272697 A1  Nov. 6, 2008

(30) Foreign Application Priority Data

May 3, 2007  (KR) .................. 10-2007-0043222
May 28, 2007  (KR) .................. 10-2007-0051558
May 28, 2007  (KR) .................. 10-2007-0051559

(51) Int. Cl.
*H01J 17/49* (2006.01)
(52) U.S. Cl. .................... 313/582; 313/112
(58) Field of Classification Search ......... 313/582–587, 313/112; 359/885
See application file for complete search history.

(56) References Cited

U.S. PATENT DOCUMENTS

| | | | |
|---|---|---|---|
| 2006/0043895 A1* | 3/2006 | Choi | 313/587 |
| 2006/0145578 A1* | 7/2006 | Park et al. | 313/112 |
| 2007/0075641 A1* | 4/2007 | Yu | 313/587 |
| 2007/0223867 A1* | 9/2007 | Hwang et al. | 385/123 |
| 2008/0012493 A1* | 1/2008 | Lee et al. | 313/582 |

FOREIGN PATENT DOCUMENTS

| | | |
|---|---|---|
| EP | 1 648 013 A2 | 4/2006 |
| EP | 1 677 336 A2 | 7/2006 |
| EP | 1 770 750 A2 | 4/2007 |
| EP | 1 833 071 A1 | 9/2007 |
| KR | 10-2006-0034053 A | 4/2006 |
| KR | 10-2006-0080116 A | 7/2006 |
| WO | WO 2005116740 A1 * | 12/2005 |

OTHER PUBLICATIONS

Korean Office Action dated Jan. 28, 2008.
European Search Report dated Jul. 16, 2009.

* cited by examiner

*Primary Examiner*—Karabi Guharay
(74) *Attorney, Agent, or Firm*—Ked & Associates, LLP

(57) ABSTRACT

A filter and a plasma display device (PDP) having the same may include a plasma display panel, an EMI shielding sheet having a plurality of shielding layers each including three or more thin film layers, and a protection sheet including a base unit having a plurality of grooves formed in one surface thereof and a plurality of pattern units formed in the grooves and having a different refractive index from that of the base unit.

24 Claims, 16 Drawing Sheets

FILTER AND PLASMA DISPLAY DEVICE THEREOF

BACKGROUND OF THE INVENTION

1. Field of the Invention

The present invention relates to a filter for a display panel, and more particularly, to a filter and a plasma display device thereof in which a sheet for protecting external light is manufactured and disposed at a front of a panel in order to protect external light incident upon the panel so that the bright room contrast of the panel is enhanced while maintaining the luminance of the panel.

2. Description of the Conventional Art

Generally, a plasma display panel (PDP) displays images including text and graphic images by applying a predetermined voltage to a plurality of electrodes installed in a discharge space to cause a gas discharge and then exciting phosphors with the aid of plasma generated as a result of the gas discharge. The PDP is easy to manufacture as large-dimension, light and thin flat displays. In addition, the PDP has advantages in that it can provide wide vertical and horizontal viewing angles, full colors and high luminance.

In the meantime, external light is reflected by a front surface of the PDP due to white phosphors that are exposed on a lower substrate of the PDP when the PDP displays black images. For this reason, the PDP may mistakenly recognize the black images as being brighter than they actually are, thereby causing contrast degradation.

SUMMARY OF THE INVENTION

The present invention proposes to solve the above problems of the prior art. It is an object of the present invention to provide a plasma display device capable of efficiently protecting external light incident upon the PDP so that the bright room contrast of the panel is enhanced while maintaining the luminance of the PDP.

The plasma display device of the present invention includes: a plasma display panel (PDP); an EMI shielding sheet, wherein shielding layers including three or more thin film layers are repeatedly stacked; and a sheet for protecting external light having a base unit of which one side is formed with a plurality of grooves and a plurality of pattern units formed inside the grooves of the base unit and having a different refractive index from that of the base unit.

The filter for displaying includes: a dielectric layer formed of oxide; a metal layer for shielding electromagnetic waves; an EMI shielding sheet, wherein protecting layers including protective layers stacked on an upper portion or a lower portion of the metal layer for protecting the metal layer are repeatedly stacked; and a sheet for protecting external light including a base unit of which one side is formed with a plurality of grooves and a plurality of pattern units formed inside the grooves of the base unit and having a different refractive index from that of the base unit.

DETAILED DESCRIPTION OF THE PREFERRED EMBODIMENT

Figure 1:
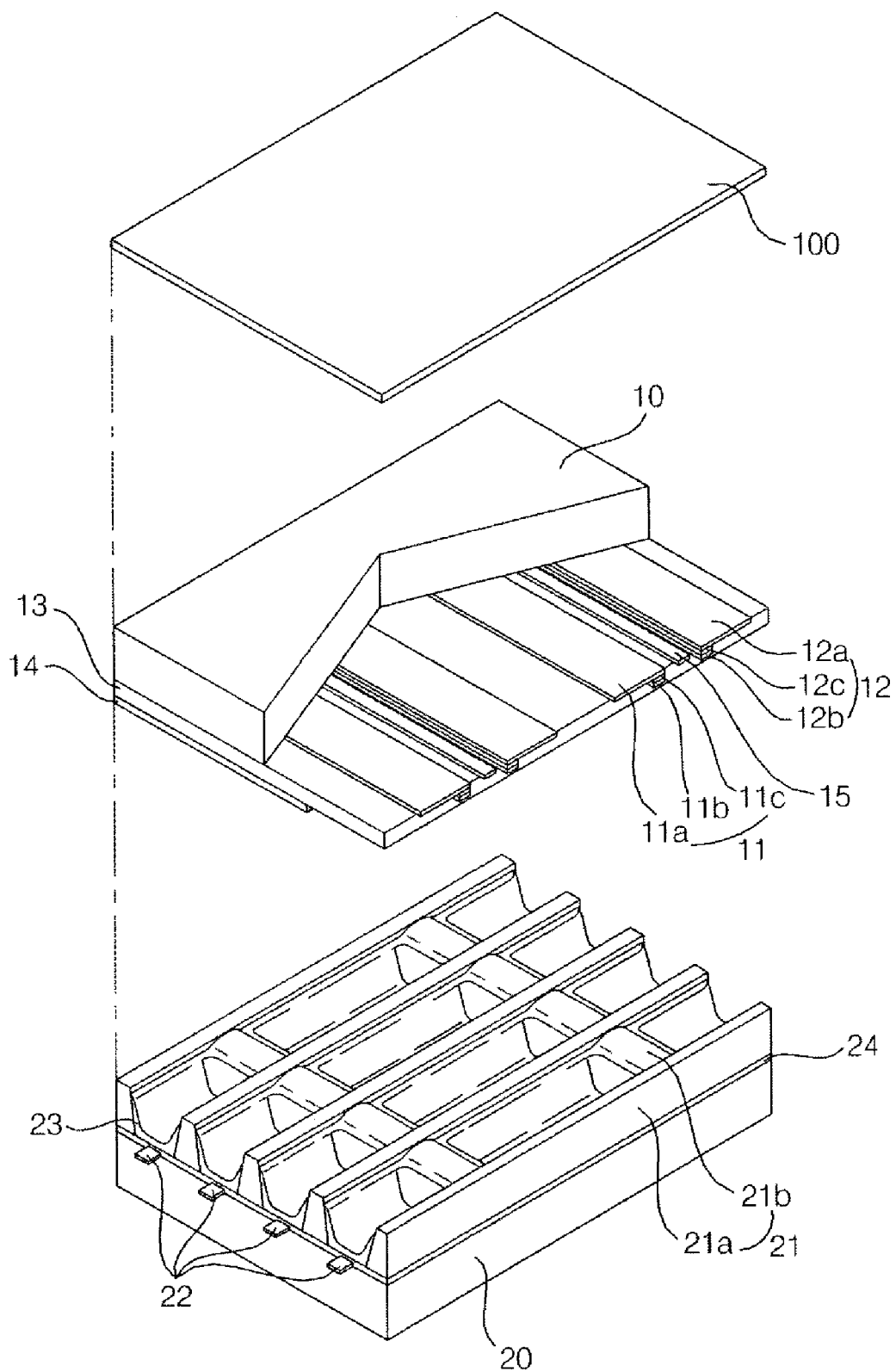
FIG. 1 is a perspective view illustrating a structure of a plasma display panel according to an embodiment of the present invention.

Hereinafter, the present invention will be described in detail with reference to the accompanying FIGS. 1 to 32, in which exemplary embodiments of the invention are shown. FIG. 1 is a perspective view illustrating a plasma display panel according to an embodiment of the present invention.

As shown in FIG. 1, the PDP includes a scan electrode 11 and a sustain electrode 12, which are a sustain electrode pair formed on an upper substrate 10, and an address electrode 22 formed on a lower substrate 20.

The sustain electrode pair 11 and 12 includes transparent electrodes 11$a$ and 12$a$ and bus electrodes 11$b$ and 12$b$ that are generally made of indium-tin-oxide (ITO). The bus electrodes 11$b$ and 12$b$ can be made of a metal such as silver (Ag) and chrome (Cr) or can be made with a stacked structure of chrome/copper/chrome (Cr/Cu/Cr) or chrome/aluminum/chrome (Cr/Al/Cr). The bus electrodes 11$b$ and 12$b$ are formed on the transparent electrodes 11$a$ and 12$a$ to reduce voltage drop due to the transparent electrodes 11$a$ and 12$a$ having high resistance.

Meanwhile, according to an embodiment of the present invention, the sustain electrode pair 11 and 12 can be composed of a stacked structure of the transparent electrodes 11$a$ and 12$a$ and the bus electrodes 11$b$ and 12$b$ or only the bus electrodes 11$b$ and 12$b$ without the transparent electrodes 11$a$ and 12$a$. Because the latter structure does not use the transparent electrodes 11$a$ and 12$a$, there is an advantage in that a cost of manufacturing a panel can be decreased. The bus electrodes 11b and 12b used in the structure can be made of various materials such as a photosensitive material in addition to the above-described materials.

A black matrix (BM), which performs a light protecting function of reducing reflection by absorbing external light that is generated from the outside of the upper substrate 10 and a function of improving purity and contrast of the upper substrate 10, may be arranged between the transparent electrodes 11a and 12a and the bus electrodes 11b and 12b of the scan electrode 11 and the sustain electrode 12.

The black matrix according to an embodiment of the present invention is formed in the upper substrate 10 and includes a first black matrix 15 that is formed in a position that is overlapped with a barrier rib 21 and second black matrixes 11c and 12c that are formed between the transparent electrodes 11a and 12a and the bus electrodes 11b and 12b. Here, the first black matrix and the second black matrixes 11c and 12c that are also referred to as a black layer or a black electrode layer may be physically connected to each other when they are formed at the same time in a forming process or may be not physically connected to each other when they are not formed at the same time.

In addition, when they are physically connected to each other, the first black matrix 15 and the second black matrixes 11c and 12c are made of the same material, but when they are physically separated from each other, they may be made of different materials.

It is also possible for bus electrodes 11b and 12b and the barrier rib 21 to perform a light protecting function of reducing reflection by absorbing external light generated from the outside and a function of improving contrast such as the black matrixes, as the bus electrodes 11b and 12b and the barrier rib 21 are dark colored. Otherwise, it is also possible to perform a function of the black matrix by making the overlapped portion viewed from the front looks like black color, as a specific element, for example a dielectric layer 13, formed in the upper substrate 10, and a specific element, for example the barrier rib 21, formed in the lower substrate 20 are complementarily colored.

An upper dielectric layer 13 and a protective film 14 are stacked in the upper substrate 10 in which the scan electrode 11 and the sustain electrode 12 are formed in parallel. Charged particles, which are generated by a discharge, are accumulated in the upper dielectric layer 13 and perform a function of protecting the sustain electrode pair 11 and 12. The protective film 14 protects the upper dielectric layer 13 from sputtering of charged particles that are generated at a gas discharge and enhances emission efficiency of a secondary electron.

In addition, the address electrode 22 is formed in an intersecting direction of the scan electrode 11 and the sustain electrode 12. Furthermore, a lower dielectric layer 24 and a barrier rib 21 are formed on the lower substrate 20 in which the address electrode 22 is formed.

In addition, a phosphor layer 23 is formed on the surface of the lower dielectric layer 24 and the barrier rib 21. In the barrier rib 21, a vertical barrier rib 21a and a horizontal barrier rib 21b are formed in a closed manner and the barrier rib 21 physically divides a discharge cell and prevents ultraviolet rays and visible light that are generated by a discharge from leaking to adjacent discharge cells.

Referring to FIG. 1, a filter 100 is preferably formed at the front of the PDP according to the present invention, and the filter 100 may include a sheet for protecting external light, an AR (Anti-Reflection) sheet, an NIR (Near Infrared) shielding sheet and an EMI (ElectroMagnetic Interference) shielding sheet, a diffusion sheet and an optical sheet.

In the case where an interval between the filter 100 and the PDP is 10 μm to 30 μm, it is possible to effectively protect light incident upon the PDP and to effectively emit light generated from the PDP to the outside. Also, the interval between the filter 100 and the PDP may be 30 μm to 120 μm in order to protect the PDP from the exterior pressure, etc., and an adhesion layer, which absorbs impact, may be formed between the filter 100 and the PDP.

In an embodiment of the present invention, various shapes of barrier rib 21 structure as well as the barrier rib 21 structure as shown in FIG. 1 can be used. For example, a differential barrier rib structure in which the vertical barrier rib 21a and the horizontal barrier rib 21b have different heights, a channel type barrier rib structure in which a channel, which can be used as an exhaust passage, is formed in at least one of the vertical barrier rib 21a and the horizontal barrier rib 21b, and a hollow type barrier rib structure in which a hollow is formed in at least one of the vertical barrier rib 21a and the horizontal barrier rib 21b, can be used.

In the differential type barrier rib structure, it is more preferable that height of the horizontal barrier rib 21b is higher than that of the vertical barrier rib 21a and in the channel type barrier rib structure or the hollow type barrier rib structure, it is preferable that a channel or a hollow is formed in the horizontal barrier rib 21b.

Meanwhile, in an embodiment of the present invention, it is described as each of R, G, and B discharge cells is arranged on the same line, but they may be arranged in other shapes. For example, delta type of arrangement in which the R, G, and B discharge cells are arranged in a triangle shape may be also used. Furthermore, the discharge cell may have various polygonal shapes such as a quadrilateral shape, a pentagonal shape, and a hexagonal shape.

Furthermore, the phosphor layer 23 emits light by ultraviolet rays that are generated at a gas discharge and generates any one visible light among red color R, green color G, or blue color B light. Here, inert mixed gas such as He+Xe, Ne+Xe, and He+Ne+Xe for performing a discharge is injected into a discharge space that is provided between the upper/lower substrates 10, 20 and the barrier rib 21.

Figure 2:
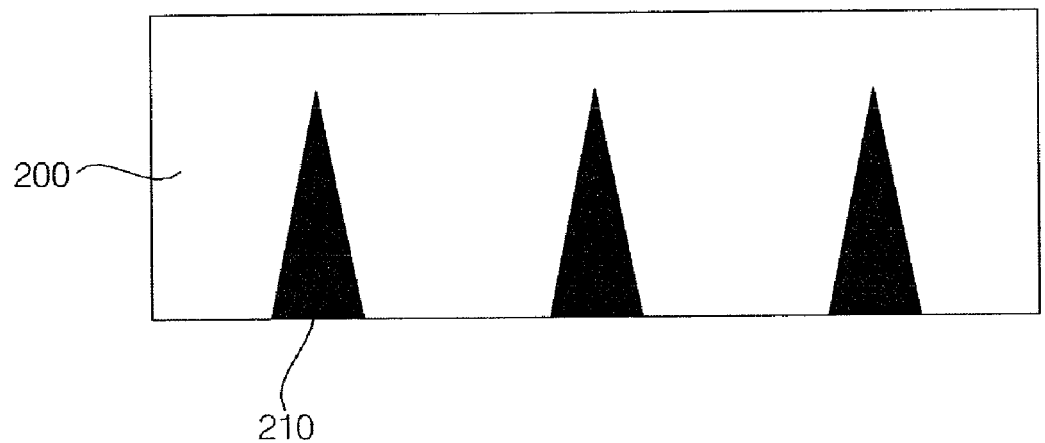
FIG. 2 is a cross-sectional view schematically illustrating a cross-sectional structure of a sheet for protecting external light according to an embodiment of the present invention.

FIG. 2 is a cross-sectional view illustrating a structure of a sheet for protecting external light provided in the filter according to the present invention, and the sheet for protecting external light includes a base unit 200 and pattern units 210.

The base unit 200 is preferably formed of a transparent plastic material, for example a UV-hardened resin-based material, so that light can smoothly transmit therethrough. Alternately, it is possible to use a hard glass material to protect the front of the PDP.

Referring to FIG. 2, the pattern units 210 may be formed as various shapes as well as triangles. The pattern units 210 are formed of a darker material than the base unit 200, preferably, formed of a black material. For example, the pattern units 210 are formed of a black carbon-based material or covered with a black dye in order to maximize the absorption of external light. Hereinafter, a wider one between the upper end and the lower end of the pattern unit 210 is referred to as a lower end of the pattern unit 210.

According to FIG. 2, the lower end of the pattern unit 210 may be arranged at a panel side, and the upper end of the pattern unit 210 may be arranged at a viewer side. Also, the lower end of the pattern unit 210 may also be arranged at the PDP side, and the upper end of the pattern unit 210 may be arranged at the viewer side, contrary to the above arrangement.

In general, an external light source is mostly located over the PDP, and thus, external light is diagonally incident on the PDP from the upper side and is absorbed in the pattern unit 210.

The pattern unit 210 may include a light-absorbing particle, and the light-absorbing particle may be a resin particle colored by a specific color. In order to maximize the light absorbing effect, the light-absorbing particle is preferably colored by a black color.

In order to maximize the absorption of external light and to facilitate the manufacture of the light-absorbing particle and the insertion into the pattern unit 210, the size of the light-absorbing particle may be 1 μm or more. Also, in the case where the size of the light-absorbing particle is 1 μm or more, the pattern unit 210 may include the light-absorbing particle of 10% weight or more in order to more effectively absorb external light refracted into the pattern unit 210. That is, the light-absorbing particle of 10% weight or more of the total weight of the pattern unit 210 may be included in the pattern unit 210.

FIGS. 3 to 6 are cross-sectional views illustrating a structure of a sheet for protecting external light according to an embodiment of the present invention in order to explain optical property in accordance with the structure of the sheet for protecting external light.

Figure 3:
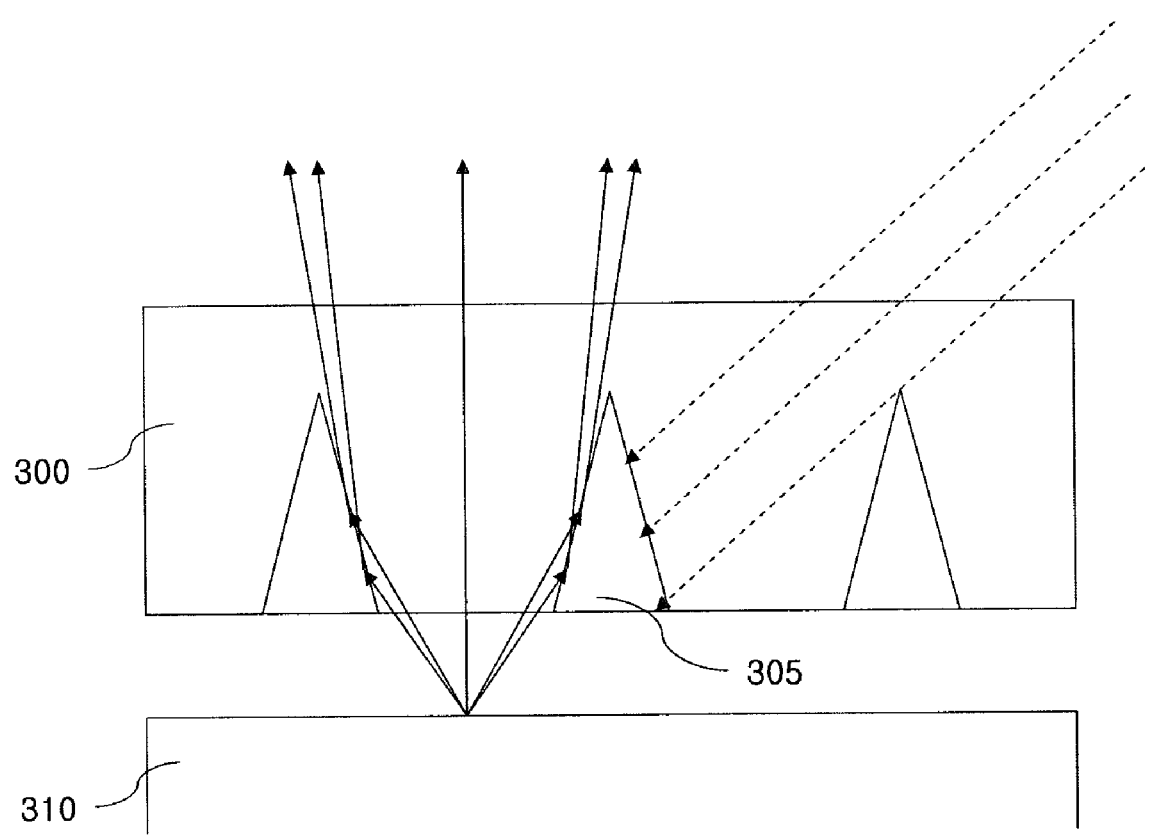
FIGS. 3 to 6 are cross-sectional views illustrating optical property according to the structure of the sheet for protecting external light.

Referring to FIG. 3, a refractive index of the pattern unit 305, particularly, a refractive index of at least the slanted surface of the pattern unit 305 is lower than a refractive index of the base unit 300 in order to enhance the reflectivity of light emitted from the PDP by totally reflecting visible light emitted from the PDP.

As described above, external light which reduces the bright room contrast of the PDP is highly likely to be above the PDP. Referring to FIG. 3, according to Snell's law, external light (illustrated as a dotted line) that is diagonally incident upon the sheet for protecting external light is refracted into and absorbed by the pattern unit 305 which has a lower refractive index than the base unit 300. External light refracted into the pattern unit 305 may be absorbed by the light absorption particle.

Also, light (illustrated as a solid line) that is emitted from the PDP 310 for displaying is totally reflected from the slanted surface of the pattern unit 305 to the outside, i.e., toward the viewer.

As described above, external light (illustrated as a dotted line) is refracted into and absorbed by the pattern unit 305 and light (illustrated as a solid line) emitted from the PDP 310 is totally reflected by the pattern unit 305 because the angle between the external light and the slanted surface of the pattern unit 305 is greater than the angle between the light emitted from the PDP 310 and the slanted surface of the pattern unit 305, as illustrated in FIG. 3.

Therefore, the sheet for protecting external light according to the present invention enhances the bright room contrast of the display image by absorbing the external light to prevent the external light from being reflected toward the viewer and by increasing the reflection of light emitted from the PDP 310.

In order to maximize the absorption of external light and the total reflection of light emitted from the PDP 310 in consideration of the angle of external light incident upon the PDP 310, a refractive index of the pattern unit 305 is preferably 0.3-1 times higher than a refractive index of the base unit 300. In order to maximize the total reflection of light emitted from the PDP 310 in consideration of the vertical viewing angle of the PDP, the refractive index of the pattern unit 305 is preferably 0.3-0.8 times higher than the refractive index of the base unit 300.

As shown in FIG. 3, when the upper end of the pattern unit 305 is arranged at the viewer side and the refractive index of the pattern unit 305 is lower than the refractive index of the base unit 300, a ghost phenomenon, that is, the phenomenon that an object is not clearly seen by a viewer may be occurred because light emitted from the PDP is reflected on the slanted surface of the pattern unit 305 toward the viewer side.

Figure 4:
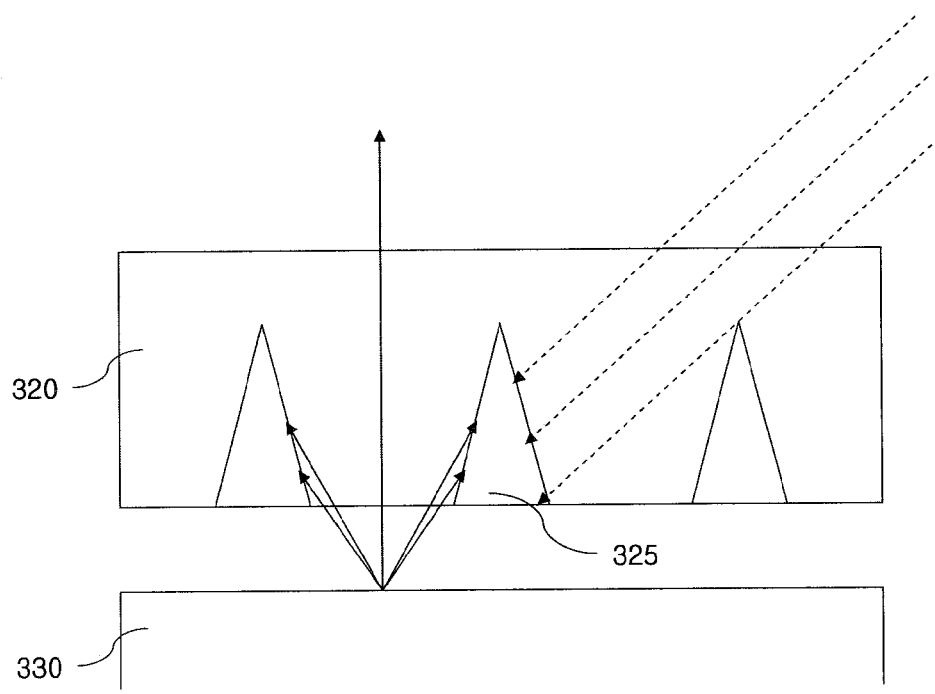

FIG. 4 illustrates the case that the upper end of the pattern unit 325 is arranged at the viewer side and the refractive index of the pattern unit 325 is higher than the refractive index of the base unit 320. Referring to FIG. 4, the refractive index of the pattern unit 325 is greater than the refractive index of the base unit 320, according to Snell's law, external light that is incident upon the pattern unit 325 is totally absorbed by the pattern unit 325.

Therefore, the ghost phenomenon may be reduced when the upper end of the pattern unit 325 is arranged at the viewer side and the refractive index of the pattern unit 325 is higher than the refractive index of the base unit 320. A difference between the refractive index of the pattern unit 325 and the refractive index of the base unit 320 is preferably 0.05 and more in order to prevent the ghost phenomenon by sufficiently absorbing light emitted from the PDP that is diagonally incident upon the pattern unit 325.

When the refractive index of the pattern unit 325 is higher than the refractive index of the base unit 320, light transmittance ratio of the sheet for protecting external light and bright room contrast may be reduced. Therefore, the difference between the refractive index of the pattern unit 325 and the refractive index of the base unit 320 is preferably 0.05-0.3 in order to prevent the ghost phenomenon and in order not to considerably reduce light transmittance ratio of the sheet for protecting external light. Also, the refractive index of the pattern unit 325 is preferably 1.0-1.3 times greater than the refractive index of the base unit 320 to prevent the ghost phenomenon while maintaining the bright room contrast at a proper level.

Figure 5:
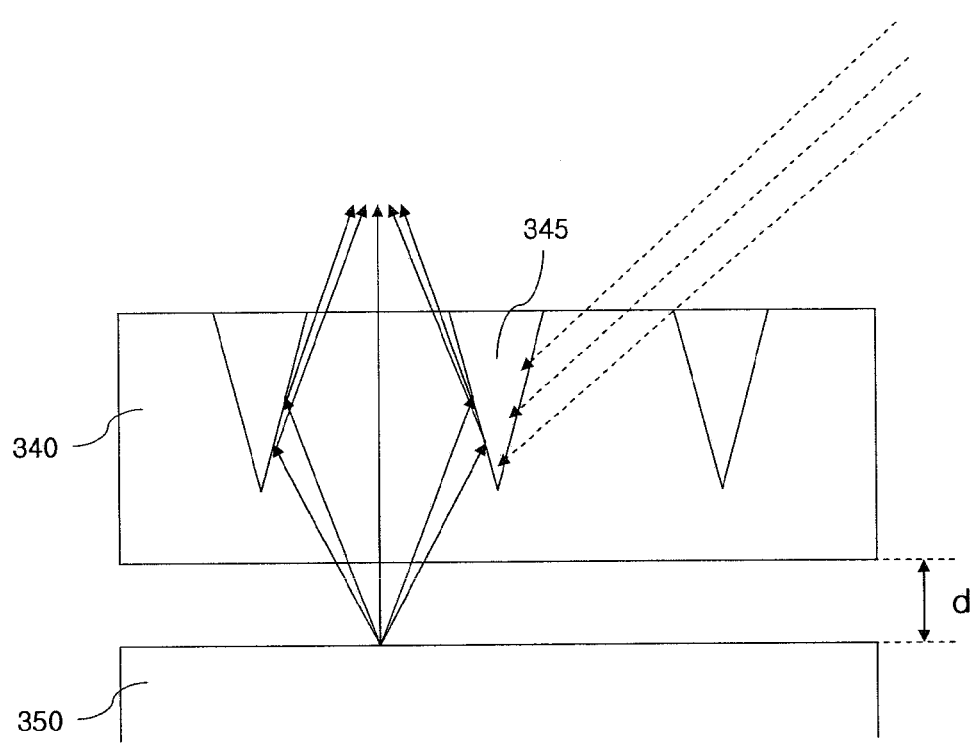

FIG. 5 illustrates the case that the lower end of the pattern unit 345 is arranged at the viewer side and the refractive index of the pattern unit 345 is lower than the refractive index of the base unit 340. As shown in FIG. 5, the external light protecting effect can be enhanced, as external light is allowed to be absorbed in the lower end of the pattern unit 345 by arranging the lower end of the pattern unit 345 at the viewer side on which external light incident. Also, an opening ratio of the sheet for protecting external light can be enhanced because an interval between the lower ends of the pattern units 345 may be increased than an interval illustrated in FIG. 4.

As shown in FIG. 5, light emitted from the PDP 350 may be reflected at the slanted surface of the pattern unit 345 and be collected around light from the PDP which passes through the base unit 340. Therefore, the ghost phenomenon may be reduced without considerably lowering the light transmittance ratio of the sheet for protecting external light.

An interval d between the PDP 350 and the sheet for protecting external light is preferably 1.5 to 3.5 mm in order to prevent the ghost phenomenon as light from the PDP is reflected from the slanted surface of the pattern unit 345 and is collected around light from the PDP which passes through the base unit 340.

Figure 6:
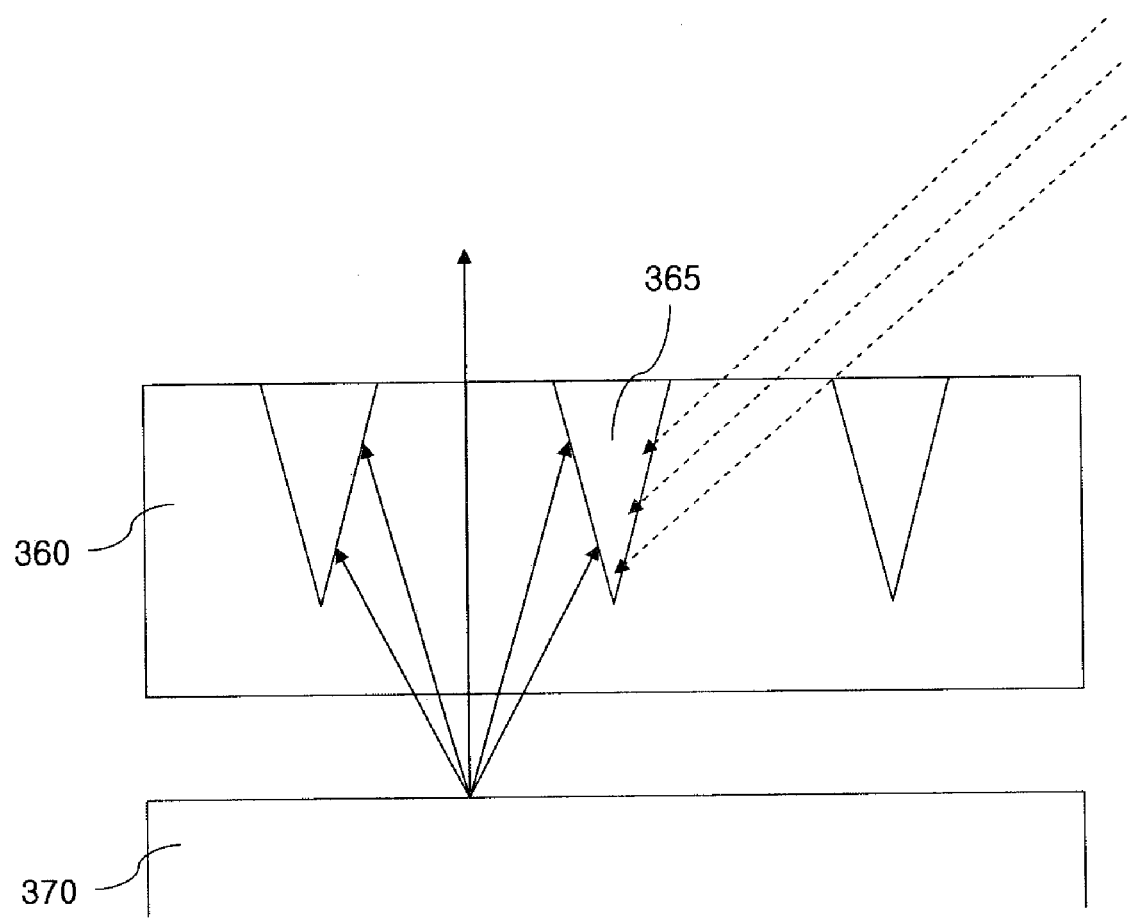

FIG. 6 illustrates the case that the lower end of the pattern unit 365 is arranged at the viewer side and the refractive index of the pattern unit 365 is higher than the refractive index of the base unit 360. As shown in FIG. 6, light from the PDP which is incident upon the slanted surface of the pattern unit 365 may be absorbed in the pattern units 365 because the refractive index of the pattern unit 365 is higher than the refractive index of the base unit 360. Therefore, the ghost phenomenon can be reduced, since images are displayed by light from the PDP which passes through the base unit 360.

In addition, the external light absorbing effect can be enhanced, since the refractive index of the pattern unit 365 is higher than the refractive index of the base unit 360.

Figure 7:
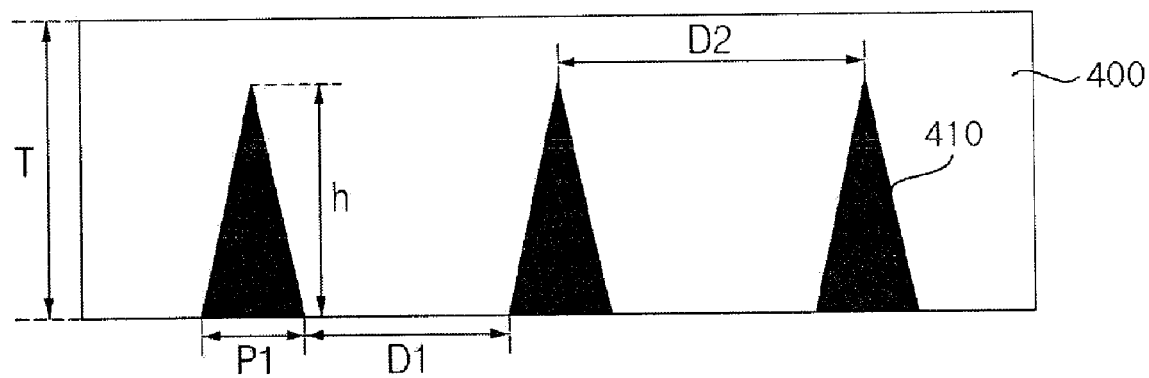
FIG. 7 is a cross-sectional view illustrating a shape of the pattern unit of the sheet for protecting external light according to a first embodiment of the present invention.

FIG. 7 is a cross-sectional view illustrating a structure of a sheet for protecting external light included in a filter according to a first embodiment of the present invention. When a thickness T of the sheet for protecting external light is 20 μm to 250 μm, the manufacture of the sheet for protecting external light can be facilitated and the appropriate light transmittance ratio of the sheet for protecting external light can be obtained. The thickness T may be set to 100 μm to 180 μm in order to smoothly transmit light emitted form the PDP, to effectively absorb and protect external light refracted into the pattern unit 410 and to enhance the durability of the sheet for protecting external light.

Referring to FIG. 7, the pattern unit 410 formed on the base unit 400 may be formed as a triangle, and more preferably, as equilateral triangles. Also, the lower end width P1 of the pattern unit 410 may be 18 μm to 36 μm, and in this case, it is possible to ensure an optimum opening ratio and maximize external light protecting efficiency so that light emitted from the PDP can be smoothly discharged toward an user side.

The height h of the pattern unit 410 is set to 80 μm to 170 μm, and thus, it is possible to make a gradient of the slanted surface capable of effectively absorbing external light and reflecting light emitted from the PDP. Also, it is possible to prevent the pattern unit 410 from being short-circuited.

In order to achieve a sufficient opening ratio to display images with optimum luminance through discharge of light emitted from the PDP toward the user side and to provide an optimum gradient of the slanted surface of the pattern unit 410 for enhancing the external light protecting efficiency and the reflection efficiency, an interval D1 between a pair of adjacent pattern units may be set to 40 μm to 90 μm, and an interval D2 between the upper ends of the pair of adjacent pattern units may be set to 90 μm to 130 μm.

Due to the above-described reasons, an optimum opening ratio for displaying images can be obtained when the interval D1 is 1.1 to 5 times greater than the lower end width P1 of the pattern unit 410. Also, in order to obtain an optimum opening ratio and to optimize the external light protecting efficiency and the reflection efficiency, the interval D1 between the lower ends of the pair of adjacent pattern units 410 may be set to be 1.5 to 3.5 greater than the lower end width of the pattern unit 410.

When the height h of the pattern unit 410 is 0.89 to 4.25 times greater than the interval D1 between the pair of adjacent pattern units, external light diagonally incident upon the sheet for protecting external light from above can be prevented from being incident upon the PDP. Also, in order to prevent the pattern unit 410 from being short-circuited and to optimize the reflection efficiency of light emitted from the PDP, the height h of the pattern unit 410 may be set to be 1.5 to 3 times greater than the interval D1 between the pair of adjacent pattern units.

In addition, when the interval D2 between the upper ends of a pair of adjacent pattern units is 1 to 3.25 times greater than the interval D1 between lower ends of a pair of adjacent pattern units, a sufficient opening ratio for displaying images with optimum luminance can be obtained. Also, in order to maximize the total reflection efficiency of light emitted from the PDP by the slanted surface of the pattern unit 410, the interval D2 between the upper ends of the pair of adjacent pattern units may be set to be 1.2 to 2.5 times greater than the interval D1 between lower ends of the pair of adjacent pattern units.

Although a structure of the sheet for protecting external light according to the present invention has been explained with the case where the upper end of the pattern unit 410 is arranged at a viewer side, it is also applicable to the case where the lower end of the pattern unit 410 is arranged at a viewer side with reference to FIG. 7.

Figure 8:
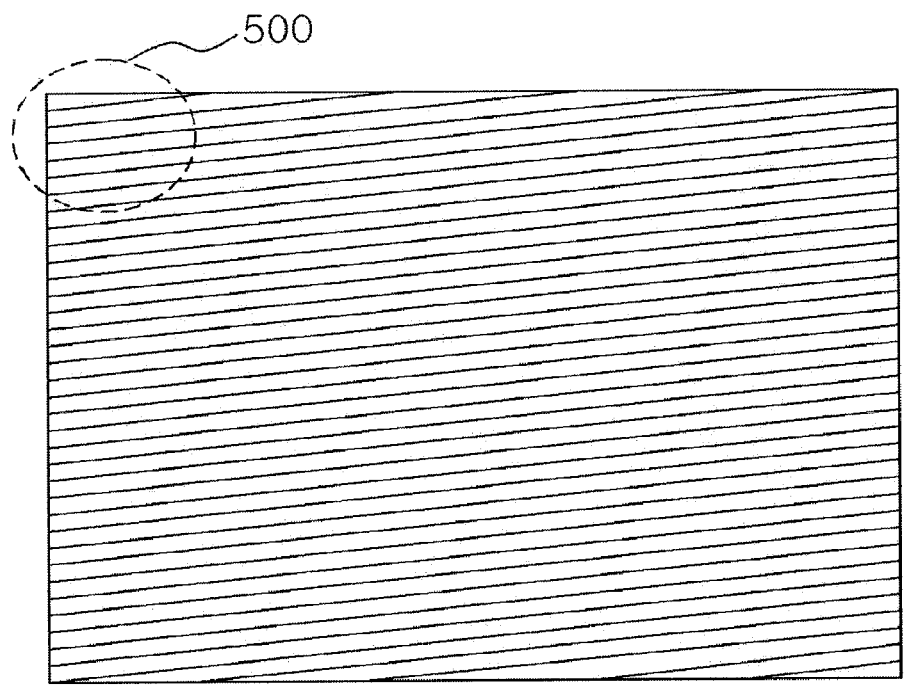
FIGS. 8 and 9 are views illustrating a front shape of the pattern unit formed on the sheet for protecting external light in a row according to an embodiment of the present invention.
Figure 9:
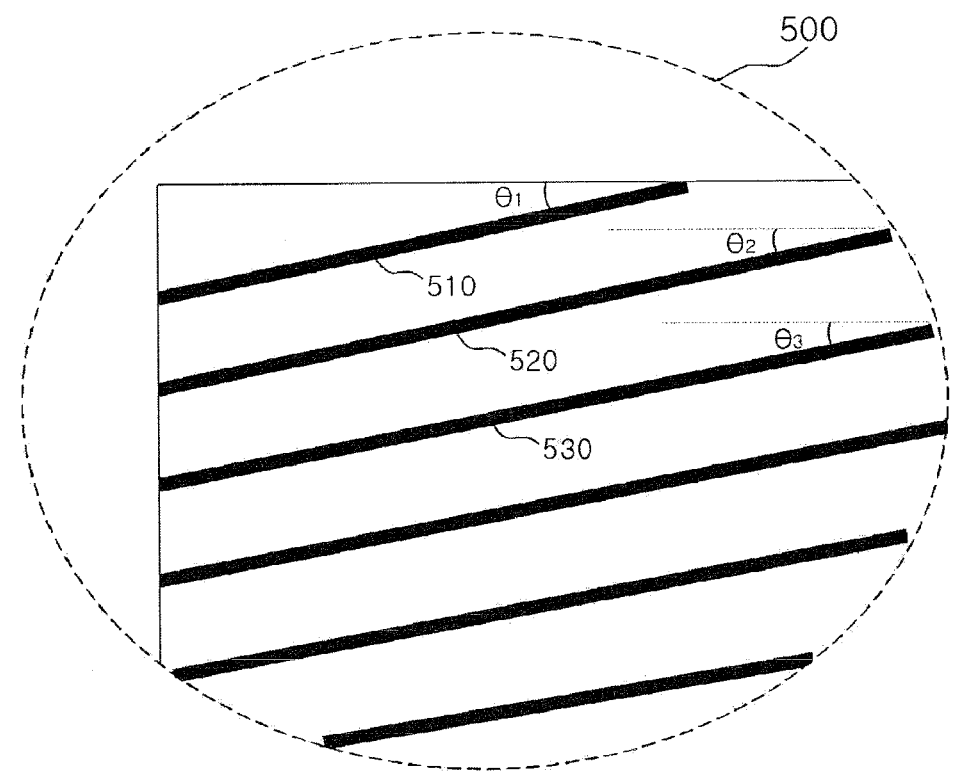

FIGS. 8 and 9 are views illustrating the front shape of the pattern unit formed on the sheet for protecting external light in a row according to an embodiment of the present invention. As shown in the drawings, the pattern unit is preferably formed on the base unit at a predetermined interval in a row.

The moire phenomenon may occur, as a black matrix, a black layer, a bus electrode and a barrier rib, etc. formed in the display panel with a predetermined pattern and a plurality of pattern units formed in the sheet for protecting external light at a predetermined interval are overlapped. The moire phenomenon is a pattern of low frequency caused by the interference between periodic images, for example there is a pattern in the shape of wave when mosquito nets are stacked.

As shown in FIGS. 8 and 9, the moire phenomenon which is generated as a black matrix, a black layer, a bus electrode and a barrier rib, etc. formed in the PDP are overlapped with a plurality of pattern units, can be reduced by diagonally forming the plurality of pattern units.

Figure 10:
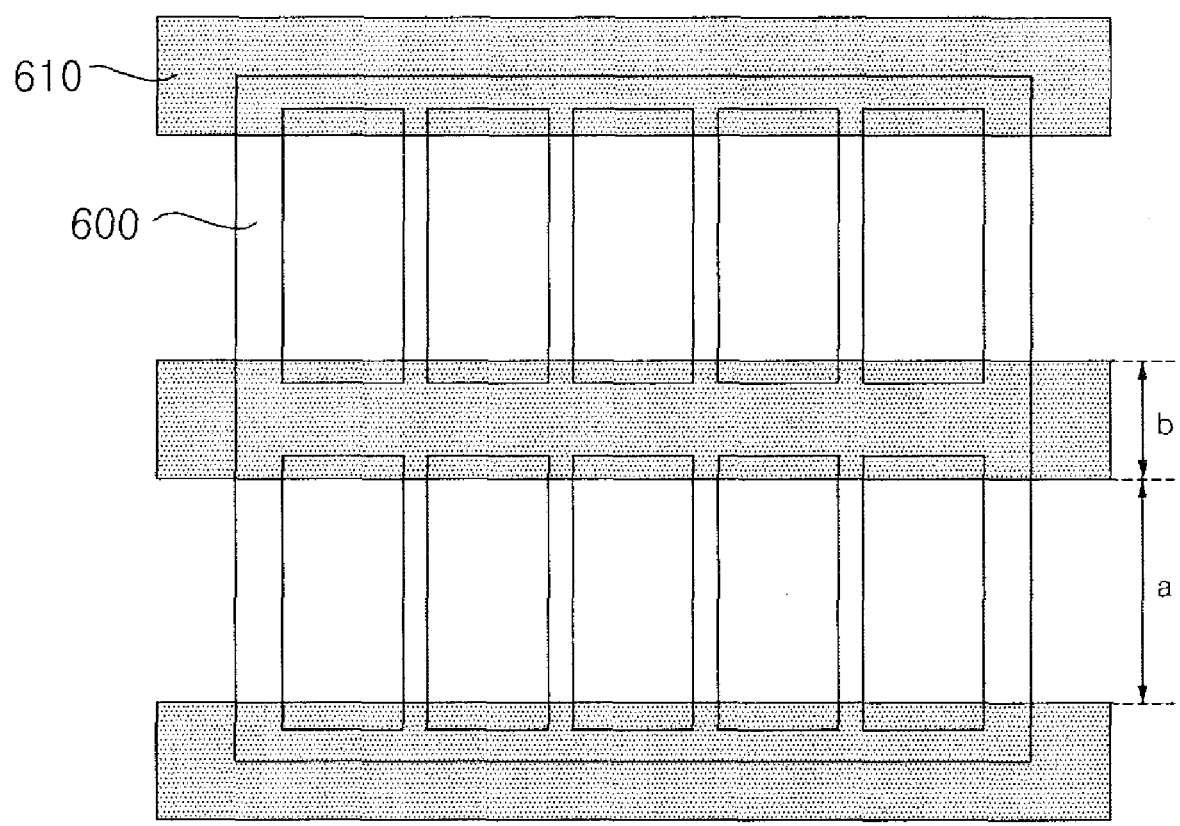
FIGS. 10 and 11 are views schematically illustrating a structure of a black matrix formed on the upper substrate of a panel according to embodiments of the present invention.
Figure 11:
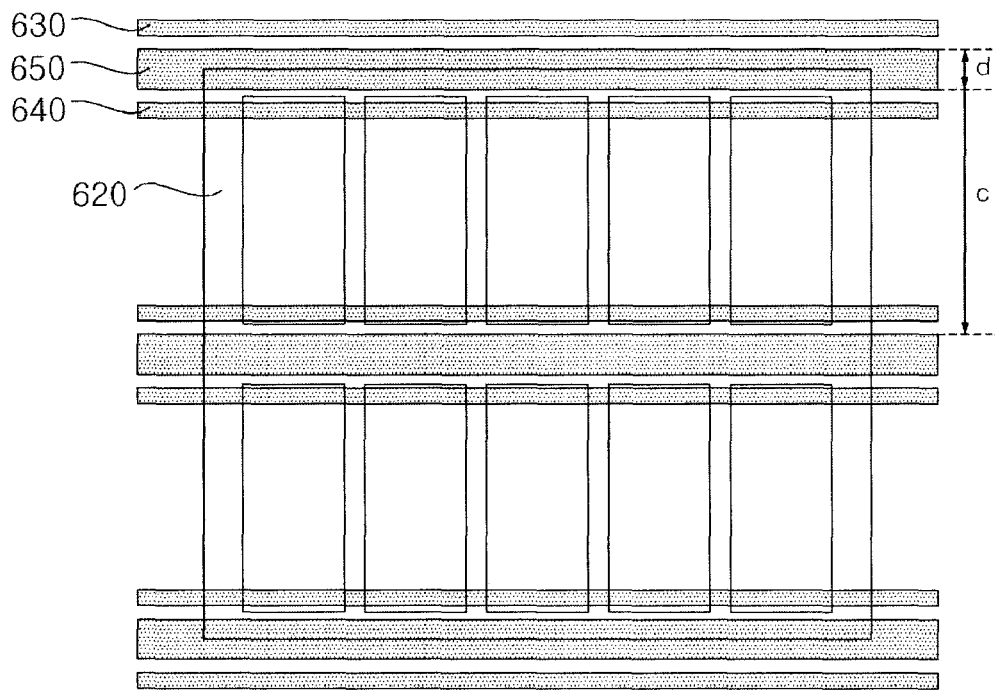
Figure 12:
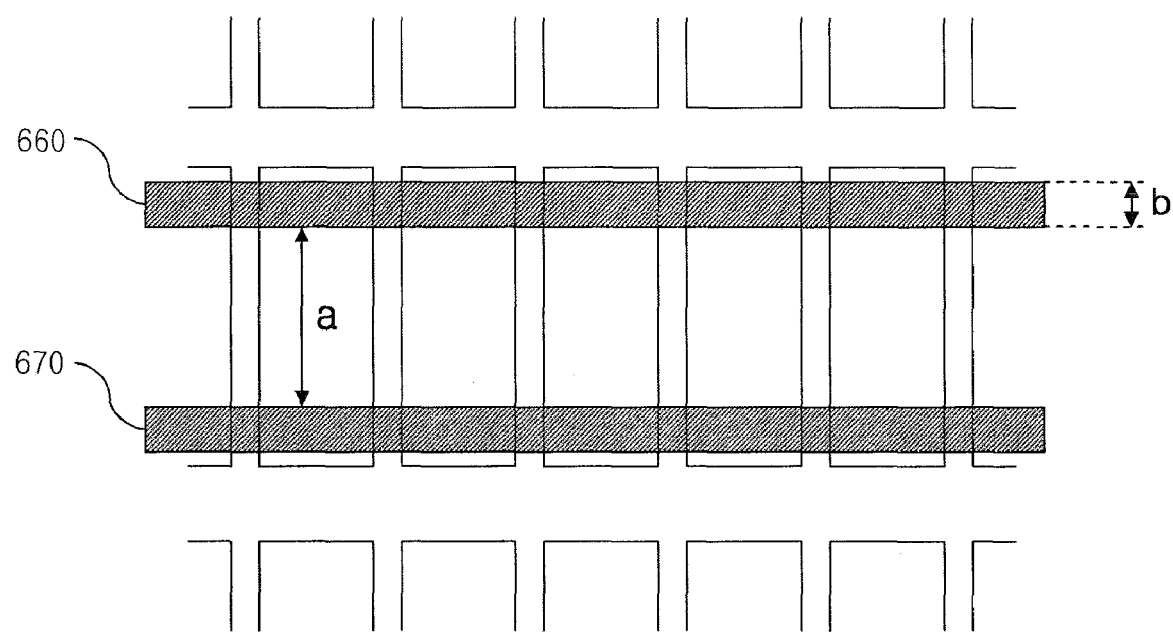
FIG. 12 is a cross-sectional view illustrating a structure of a bus electrode formed on the upper substrate of the panel according to the embodiment of the present invention.

As shown in FIGS. 10 and 11, black matrixes 610 and 650 are formed on an upper substrate of the PDP in a parallel direction to a horizontal barrier rib formed on a lower substrate of the PDP so that the black matrixes are parallel to the upper end or lower end of the sheet for protecting external light as shown in FIGS. 8 and 9. Therefore, in FIG. 9 the angles $\Theta 1$, $\Theta 2$ and $\Theta 3$ between the pattern units and the upper end of the sheet for protecting external light present the angles between the pattern unit of the sheet for protecting external light and the black matrixes formed on the PDP.

When the pattern unit is diagonally formed having viewing angle of 20 degrees or less with the black matrixes formed on the PDP, the moire phenomenon can be reduced. Also, considering that the external light incident upon the PDP is mostly located over the head of a viewer, reflection efficiency of light emitted from the PDP can be enhanced and external light can be most effectively protected by preventing the moire phenomenon simultaneously with obtaining optimum opening ratio, when the angles between the pattern units and the black matrixes are 5 degrees or less.

FIG. 9 is an enlarged view of a portion 50 of the sheet for protecting external light as shown in FIG. 8, wherein the pattern units 510, 520, and 530 formed in a row are preferably to be parallel to each other. Even in the case where they are not parallel, the angles between the pattern units 510, 520, and 530 black matrixes preferably have the range described above, respectively.

Also, based on the same reason as above, when the angles $\Theta 1$, $\Theta 2$ and $\Theta 3$ between the pattern units of the sheet for protecting external light and a bus electrode formed on the upper substrate of the PDP or a horizontal barrier rib formed on the lower substrate of the PDP are 20 degrees or less, the moire phenomenon can be reduced. Also, considering that the external light incident upon the PDP is mostly located over the head of a viewer, reflection efficiency of light emitted from the PDP can be enhanced and external light can be most effectively protected by preventing the moire phenomenon simultaneously with obtaining optimum opening ratio, when the angles Θ1, Θ 2 and Θ 3 between the pattern units and the bus electrode or the horizontal barrier rib are 5 degrees or less.

In FIGS. 8 and 9, the pattern units are diagonally formed in a direction to the left upper end from the right lower end, however, the pattern units may be diagonally formed in a direction to the right lower end from the left upper end of the sheet for protecting external light, having the angles as described above, in another embodiment.

FIGS. 10 and 11 are views schematically illustrating a structure of a black matrix formed on a panel according to embodiments of the present invention.

Referring to FIG. 10, a black matrix 610 may be formed to be overlapped with a horizontal barrier rib formed on a lower substrate 600. Also, as shown in FIG. 10, the black matrix 610 may be formed to be overlapped with a scan electrode and a sustain electrode formed on the upper substrate so that the scan electrode and the sustain electrode are covered by the black matrix 610.

In this case, when a thickness b of the black matrix 610 is 200 μm to 400 μm and an interval a between the black matrixes adjacent to each other is 300 μm to 600 μm, the opening ratio of the PDP for obtaining optimum luminance of display images can be obtained, and at the same time, the light protecting function of reducing reflection by absorbing external light that is generated from the outside and the function of improving purity and contrast of the upper substrate can be maximized.

Referring to FIG. 11, the black matrix 650 may be formed spacing from the scan electrode and sustain electrode 630 and 640 formed on the upper substrate 620.

In this case, when a thickness d of the black matrix 650 is 70 μm to 150 μm and an interval c between the black matrixes adjacent to each other is 500 μm to 800 μm, the opening ratio of the PDP for obtaining optimum luminance of display images can be obtained, and at the same time, the light protecting function of reducing reflection by absorbing external light that is generated from the outside and the function of improving purity and contrast of the upper substrate can be maximized.

As described above, as the patterns of the pattern units of the sheet for protecting external light are overlapped with the patterns of the black matrixes formed on the upper substrate, the moire phenomenon may occur.

When a width of the black matrix is 3 to 15 times greater than a width P1 of the pattern unit, the moire phenomenon is prevented as well as optimum opening ratio of the PDP is obtained, making it possible to maximize the external light protecting function. Also, when an interval of the black matrixes adjacent to each other is 4 to 12 times greater than an interval D1 of two pattern units adjacent to each other, the light emitted from the PDP passes between the black matrixes to be totally reflected onto the slanted surface of the pattern unit of the sheet for protecting external light, making it possible to optimize reflection efficiency emitted to the outside and to reduce the moire phenomenon.

In the case where the black matrix 610 is formed to be overlapped with the scan electrode and the sustain electrode as shown in FIG. 10, when a width b of the black matrix 610 is 10 to 15 times greater than a width P1 of the pattern unit of the sheet for protecting external light, the moire phenomenon can be prevented as well as the optimum opening ratio of the PDP can be obtained and the external light protecting efficiency can be optimized. And, the reflection efficiency of the light emitted from the PDP can be optimized and the moire phenomenon can be reduced, when an interval a between the black matrixes adjacent to each other is 4 to 9 times greater than an interval between the pattern units adjacent to each other.

When the black matrix 650 is formed to be spaced from the scan electrode and sustain electrode 630 and 640 as shown in FIG. 11, the moire phenomenon can be prevented as well as the external light protecting efficiency can be maximized, when a width d of the black matrix 650 is 3 to 7 times greater than a width P1 of the pattern unit of the sheet for protecting external light. And, the reflection efficiency of the light emitted from the PDP can be optimized and the moire phenomenon can be reduced, when an interval c between the black matrixes adjacent to each other is 7 to 12 times greater than an interval between the pattern units adjacent to each other.

Figure 13:
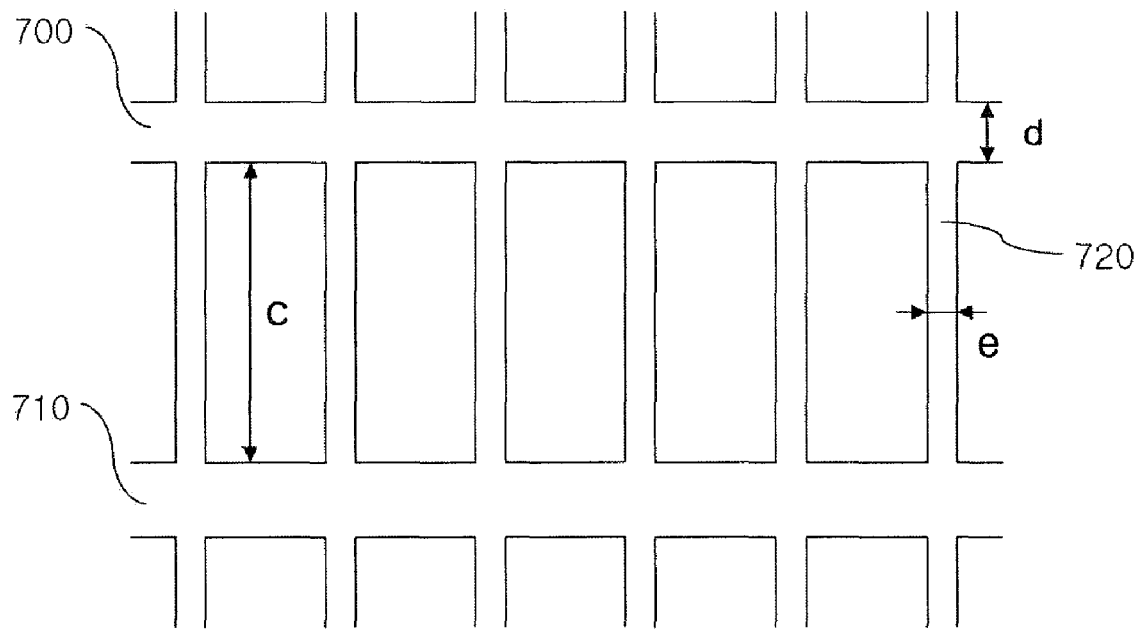
FIGS. 13 and 14 are views illustrating a structure of a barrier rib formed on the lower substrate of the panel according to the embodiments of the present invention.

FIG. 13 is a cross-sectional view illustrating a structure of a bus electrode formed on an upper substrate of a PDP according to the present invention.

As explained with reference to FIG. 7, an interval between the pattern units of the sheet for protecting external light, adjacent to each other, is preferably set to 40 μm to 90 μm, and when an interval a between the two bus electrodes 660 and 670 formed on the upper substrate of the PDP, adjacent to each other, is 225 μm to 480 μm, the opening ratio of the PDP for obtaining optimum luminance of display images can be obtained and at the same time, a discharge starting voltage can be reduced. Therefore, when the interval a between two bus electrodes 660 and 670 adjacent to each other is 2.5 to 12 times greater than the interval between two pattern units adjacent to each other, optimum opening ratio of the PDP can be obtained as well as the external light protecting efficiency can be maximized and the reflection efficiency of the light emitted from the PDP can be optimized.

Also, in order to reduce the moire phenomenon generated due to the overlap of the pattern unit of the sheet for protecting external light and the bus electrode, the interval between the pattern units adjacent to each other is preferably set to 40 μm to 60 μm, and the interval a between two bus electrodes 660 and 670, adjacent to each other, is preferably set to 225 μm to 480 μm. Therefore, when the interval a between two bus electrodes 660 and 670 adjacent to each, is 4 to 10 times greater than the interval between two pattern units adjacent to each other, optimum opening ratio of the PDP can be obtained as well as the external light protecting efficiency can be maximized and the reflection efficiency of the light emitted from the PDP can be optimized simultaneously with reducing the moire phenomenon.

As explained with reference to FIG. 7, the lower end width of the pattern unit of the sheet for protecting external light is preferably set to 18 μm to 35 μm, and when the width b of the bus electrode 660 formed on the upper substrate of the PDP is 45 μm to 90 μm, optimum resistance and capacitance for driving the PDP can be obtained and the opening ratio of the PDP for optimum luminance of display images can be obtained. Therefore, in order that the optimum resistance and capacitance for driving the PDP can be obtained and the opening ratio of the PDP for optimum luminance of display images can be obtained, the lower end width of the pattern unit is preferably set to 0.2 to 0.8 times greater than the width b of the bus electrode 660.

Figure 14:
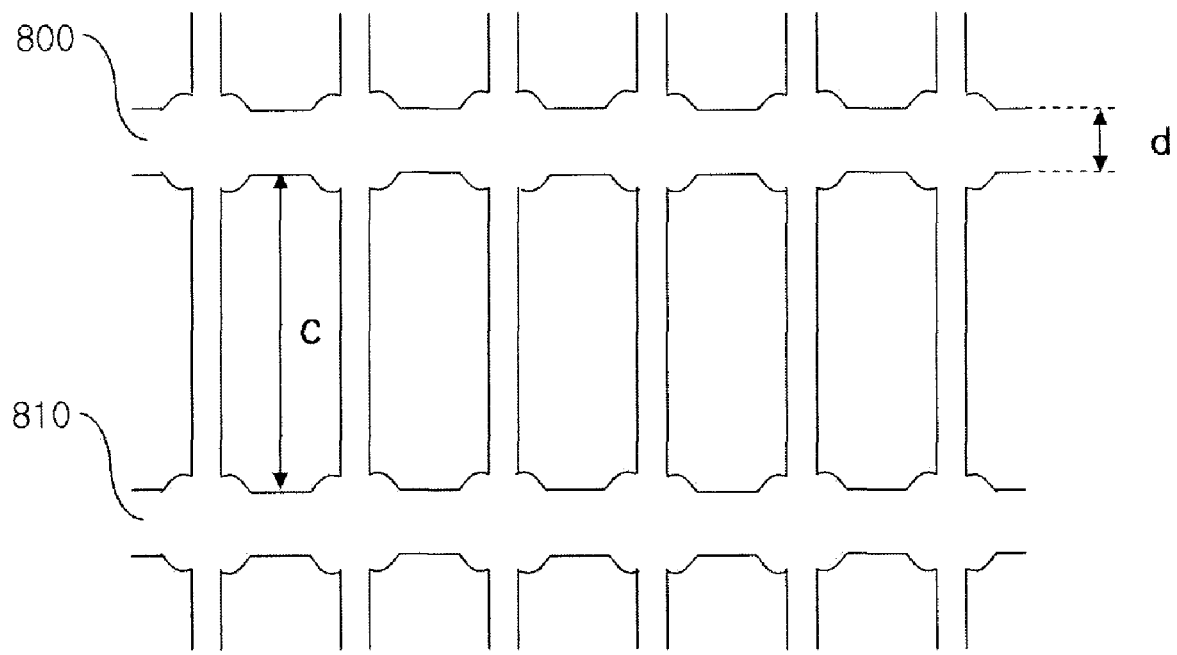

FIGS. 13 and 14 are views illustrating a structure of a barrier rib formed on the lower substrate of a PDP according to the present invention, wherein the barrier rib includes a vertical barrier rib 720 formed in an intersecting direction with a bus electrode formed on the upper substrate and horizontal barrier ribs 700 and 710 formed in an intersecting direction with the vertical barrier rib 720.

Considering the obtaining of optimum luminance of display images and resolution, the interval c between two horizontal barrier ribs 700 and 710 adjacent to each other is preferably set to 540 μm to 800 μm. Therefore, considering that the interval between two pattern units adjacent to each other is 40 μm to 90 μm, for obtaining the optimum opening ratio of the PDP as well as for enhancing the external light protecting efficiency and the reflection efficiency of light emitted from the PDP, the interval c between two barrier ribs 700 and 710 adjacent to each other is preferably set to 6 to 20 times greater than the interval between two pattern units adjacent to each other.

Also, when the interval between the pattern units adjacent to each other is 40 μm to 60 μm and the interval c between the horizontal barrier ribs 700 and 710 adjacent to each other is 600 μm to 700 μm, the moire phenomenon generated due to the overlap of the pattern unit of the sheet for protecting external light and the horizontal barrier rib of the PDP can be reduced. Therefore, when the interval between two horizontal barrier ribs 700 and 710 adjacent to each other is 10 to 17.5 times greater than the interval between two pattern units adjacent to each other, the light protecting efficiency of reducing reflection by absorbing external light that is generated from the outside and the efficiency of improving purity and contrast of the upper substrate can be maximized simultaneously with reducing the moire phenomenon.

As explained with reference to FIG. 7, the lower end width of the pattern unit of the sheet for protecting external light is preferably set to 18 μm to 35 μm, and when the upper end width d of the horizontal barrier rib 700 is 45 μm to 90 μm, optimum opening ratio of the PDP for obtaining optimum luminance of display images can be obtained. Therefore, in order that the optimum opening ratio of the PDP for optimum luminance of display images can be obtained and the moire phenomenon generated due to the overlap of the pattern unit of the sheet for protecting external light and the horizontal barrier rib of the PDP can be reduced, the lower end width of the pattern unit is preferably set to 0.2 to 0.8 times greater than the upper end width d of the horizontal barrier rib 700.

As shown in FIG. 14, a width of a portion of barrier ribs 800 and 810 may be different from those of others. In the case where the barrier ribs 800 and 810 have a structure as shown in FIG. 14, the interval c between two horizontal barrier ribs 800 and 810 adjacent to each other and the upper end width d of the horizontal barrier rib 800 may be defined based on a straight portion of the barrier ribs.

FIGS. 15 to 19 are cross-sectional views illustrating the shape of the pattern unit of the sheet for protecting external light according to other embodiments of the present invention.

Figure 15:
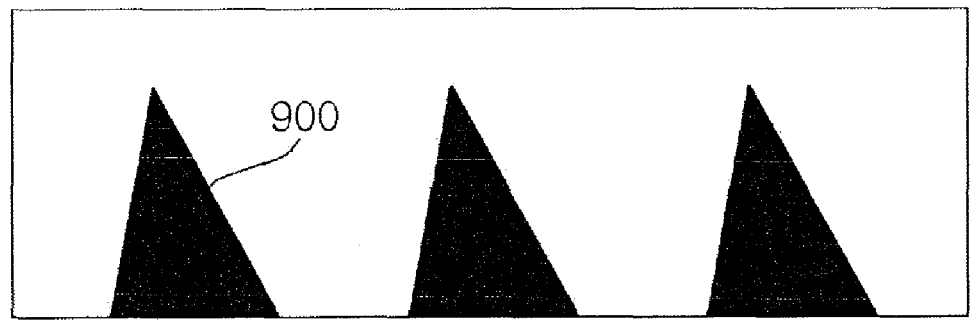
FIGS. 15 to 19 are cross-sectional views illustrating a shape of the pattern unit of the sheet for protecting external light according to second to seventh embodiments of the present invention.

Referring to FIG. 15, the pattern unit 900 may be horizontally asymmetrical. That is, left and right slanted surfaces of the pattern units 900 may have different areas or may form different angles with the lower end. In general, an external light source is located above the PDP, and thus, external light is highly likely to be incident upon the PDP from above within a predetermined angle range. Therefore, in order to enhance the absorption of external light and the reflection rate of light emitted from the PDP, upper slanted surface of two slanted surfaces of the pattern units 900 may be more gentle than lower slanted surface. That is, the upper slanted surface of two slanted surfaces of the pattern units 900 may be less steep than lower slanted surface.

Figure 16:
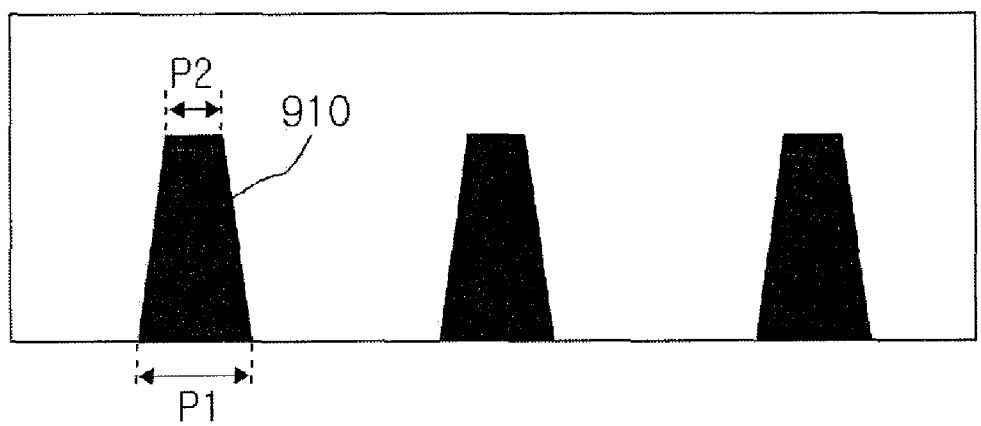

Referring to FIG. 16, the pattern unit 910 may be trapezoidal, and in this case, the upper end width P2 of the pattern unit is less than the lower end width P1 of the pattern unit. Also, the upper end width P2 of the pattern unit 910 may be 10 μm or less, and therefore the slope of the slanted surface can be determined according to the relationship between the lower end width P1 so that the absorption of external light and the reflection of light emitted from the PDP can be optimized.

Figure 17:
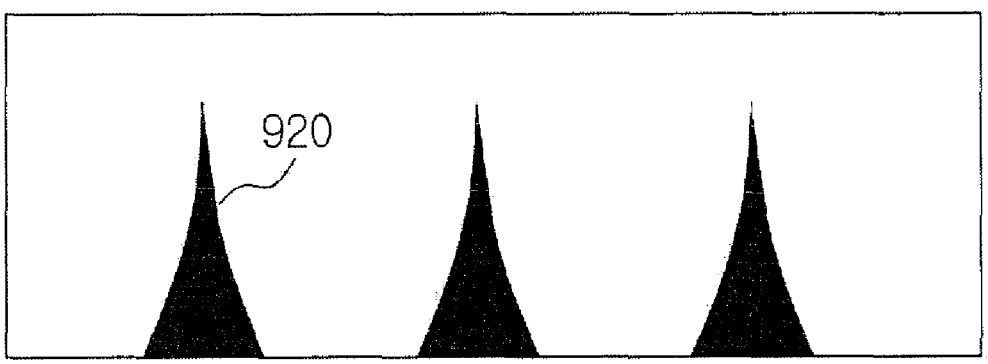
Figure 19:
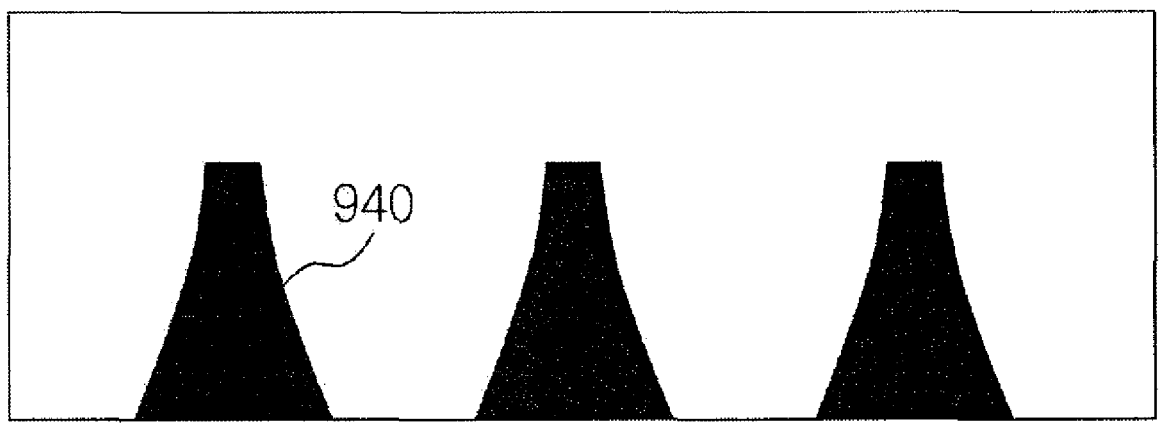

As shown in FIGS. 17 and 19, the pattern units 920, 930 and 940 of the sheet for protecting external light may have a curved profile having a predetermined curvature at the left and right slanted surfaces. In this case, the slope angle of the slanted surface of the pattern units 920, 930 and 940 is preferably getting gentle in a direction to the upper end from the lower end.

Figure 18:
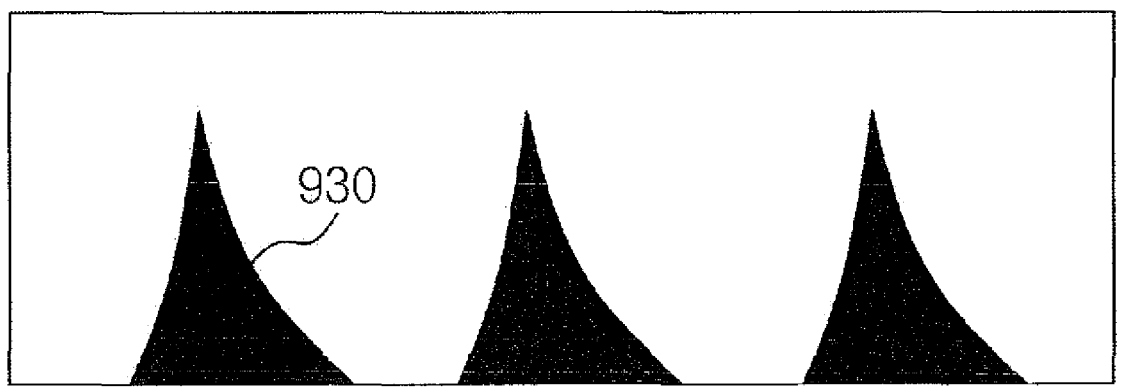

Also, according to the embodiment with reference to the shape of the pattern unit shown in FIGS. 17 to 19, the edge portion of the pattern unit may have a curved profile having a predetermined curvature.

Figure 20:
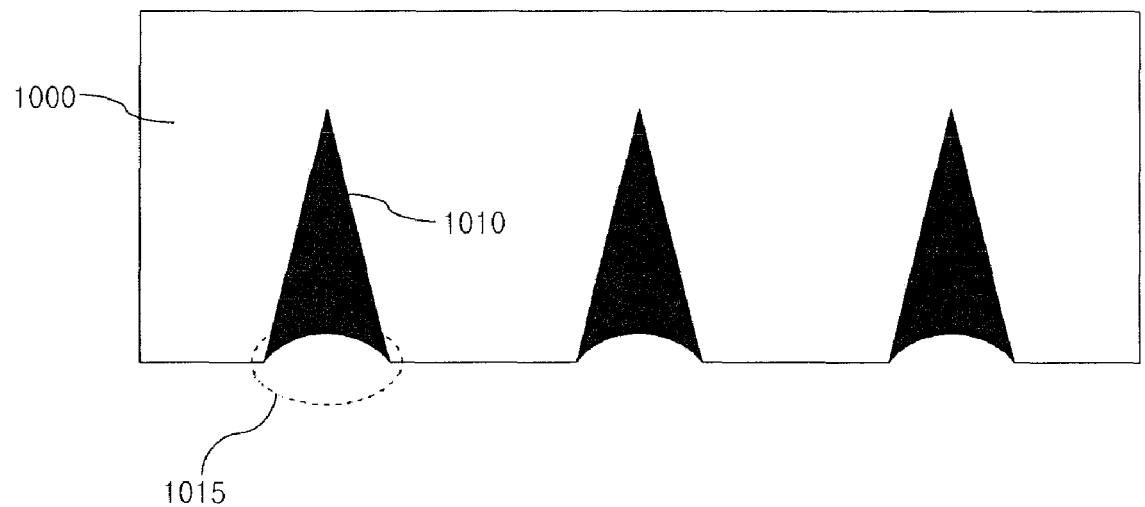
FIGS. 20 to 25 are cross-sectional views illustrating a cross-sectional shape of the pattern unit having concave profile at the lower end thereof according to embodiments of the present invention and explaining the optical property thereof.

FIG. 20 is a cross-sectional view illustrating the shape of the pattern unit of concave profile at the lower end according to embodiments of the present invention.

As shown in FIG. 20, bleeding phenomenon of the image that is generated as light emitted from the PDP is reflected on the lower end 1015 of the pattern unit can be reduced by forming a center of the lower end 1015 of the pattern unit as a round hole or a concave. Also, when the sheet for protecting external light is attached to another functional sheet or the PDP, adhesive force can be enhanced as the area of the contact portion is increased.

That is, the pattern unit 1010 having a concave lower end 1015 may be formed by forming the pattern unit 1010 in which the height of the center area is lower than the height of the outer most contour.

The pattern unit 1010 may be formed by filling light-absorbing material into a groove formed in the base unit 1000, wherein some of the grooves formed in the base unit 1000 may be filled by the light-absorbing materials and the rest of the grooves may be left as an occupied space. Therefore, the lower end 1015 of the pattern unit 1010 may be a concave shape in which the center area is depressed into the inside.

Figure 21:
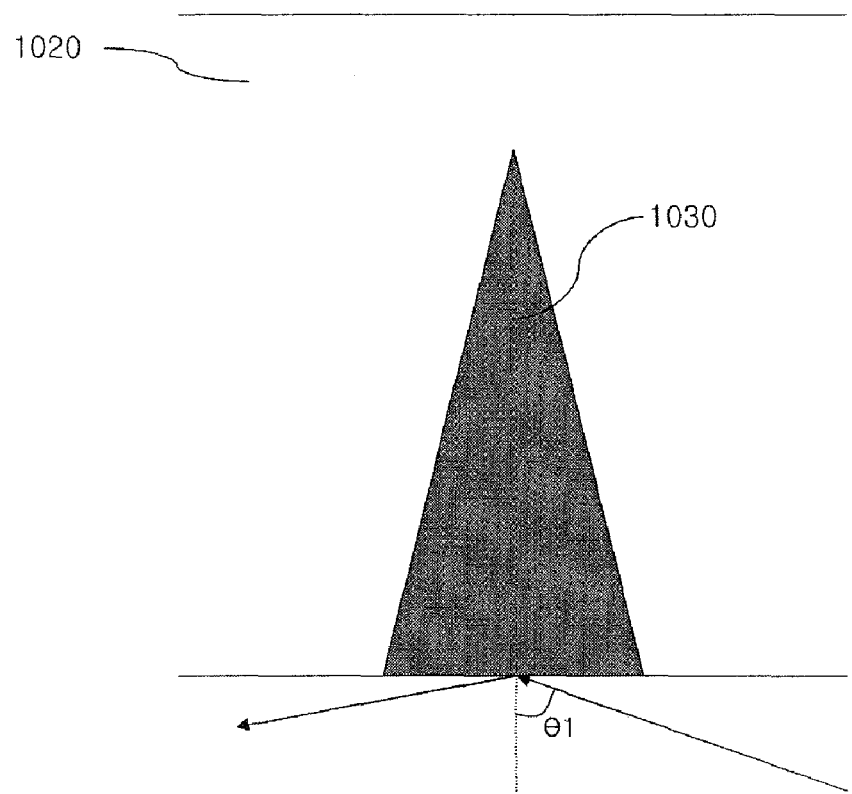
Figure 22:
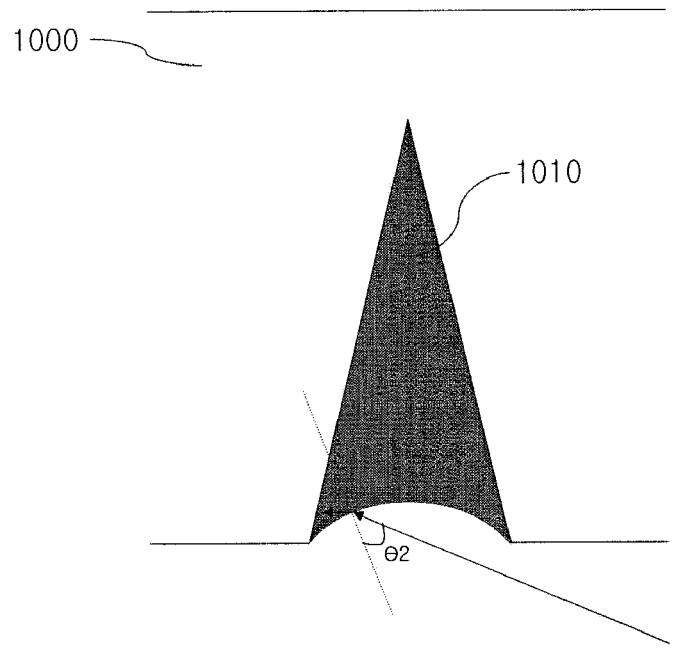

As shown in FIG. 21, light that is emitted from the PDP and diagonally incident upon the lower end of the pattern unit 1030 may be reflected toward the PDP, when the lower end of the pattern unit 1030 is flat. As images, to be displayed at a specific position by light reflected toward the PDP, are displayed around the specific position, and thus, the sharpness of the display images may be reduced because the bleeding phenomenon occurs.

Referring to FIG. 21, the incident angle θ2 that is diagonally incident upon the lower end of the pattern unit 1010 having a depressed shape is smaller than the incident angle θ1 that is incident upon the lower end of the pattern unit 1030 having a flat shape shown in FIG. 21. Therefore, the PDP light that is reflected on the lower end of the pattern unit 1030 having a flat shape shown in FIG. 21 may be absorbed into the pattern unit 1010 at the lower end of the pattern unit 1010 having a depressed shape shown in FIG. 22. Therefore, the sharpness of the display images may be enhanced by reducing the bleeding phenomenon of the display images.

Figure 23:
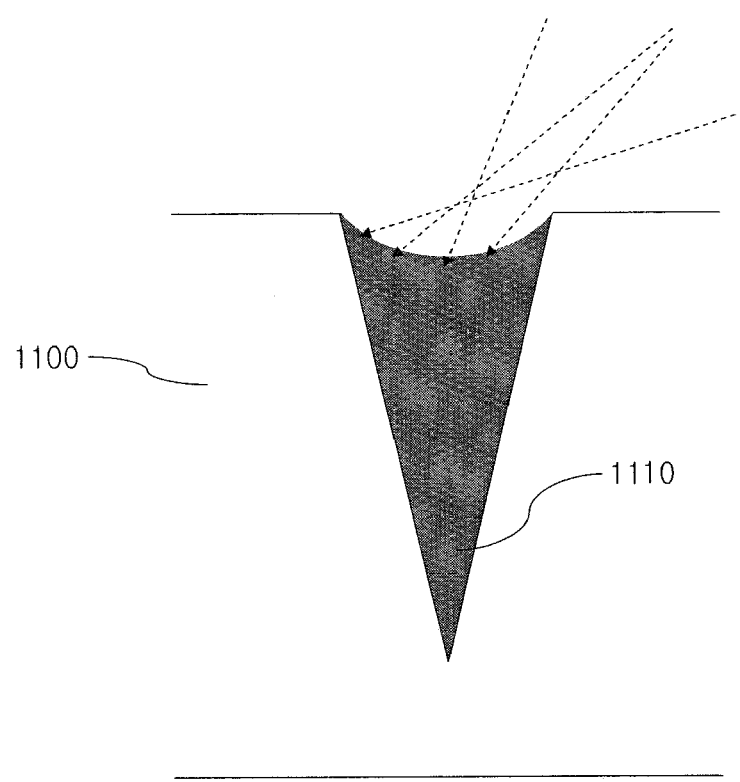

FIG. 23 is a cross-sectional view illustrating a structure of the sheet for protecting external light with the pattern unit 1110 having a concave shape at the lower end, which is arranged at a viewer side.

Referring to FIG. 23, the incident angle range of external light that is absorbed in the lower end of the pattern unit 1110 can be increased by forming the lower end of the pattern unit 1110 as a concave. That is, when the lower end of the pattern unit 1110 is formed as a concave, the incident angle of external light that is incident upon the lower end of the pattern unit 1110 may be increased, and thus, the absorption of external light can be increased.

Figure 24:
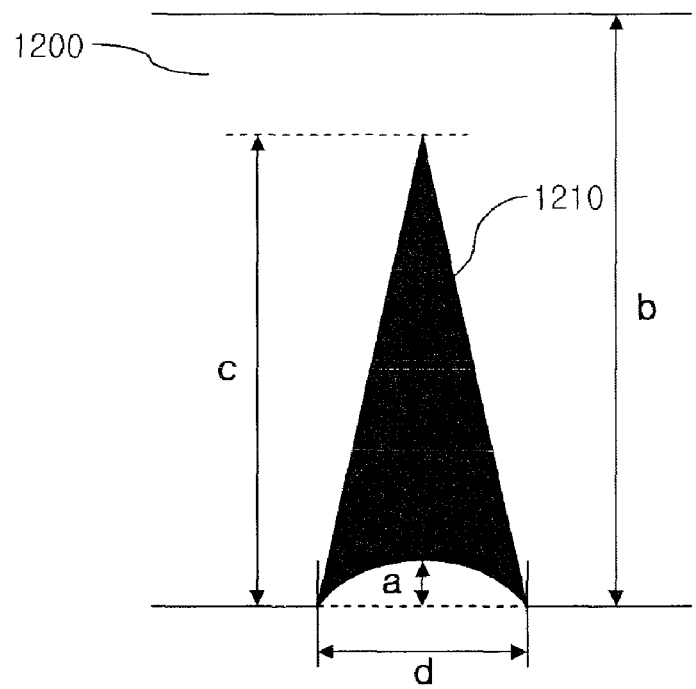

FIG. 24 is a cross-sectional view illustrating the shape of the pattern unit having a concave shape at the lower end according to the embodiment of the present invention. Table 1 presents experimental results about the bleeding phenomenon of the display images according to the depth a of the groove of the width d of the pattern unit 1210, that is, Table 1 presents experimental results about whether the bleeding phenomenon of images is reduced or not compared with the PDP in which the panel for protecting external light having flat pattern unit is arranged.

TABLE 1

| Depth (a) of groove | Lower end width (d) of pattern unit | Reduction of bleeding phenomenon |
|---|---|---|
| 0.5 μm | 27 μm | X |
| 1.0 μm | 27 μm | X |
| 1.5 μm | 27 μm | ◯ |
| 2.0 μm | 27 μm | ◯ |
| 2.5 μm | 27 μm | ◯ |
| 3.0 μm | 27 μm | ◯ |
| 3.5 μm | 27 μm | ◯ |
| 4.0 μm | 27 μm | ◯ |
| 4.5 μm | 27 μm | ◯ |
| 5.0 μm | 27 μm | ◯ |
| 5.5 μm | 27 μm | ◯ |
| 6.0 μm | 27 μm | ◯ |
| 6.5 μm | 27 μm | ◯ |
| 7.0 μm | 27 μm | ◯ |
| 7.5 μm | 27 μm | X |
| 8.0 μm | 27 μm | X |
| 9.0 μm | 27 μm | X |
| 9.5 μm | 27 μm | X |

As described in Table 1, the sharpness of the display images may be enhanced by reducing the bleeding phenomenon of the display images, when a depth a of the depressed groove formed in the lower end of the pattern unit 1210 is 1.5 μm to 7.0 μm.

Also, the depth a formed in the lower end of the pattern unit 1210 is preferably 2 μm to 5 μm in consideration of the protection of the pattern unit 1210 from the exterior pressure, and the manufacturing facilitation of the pattern unit 1210.

As described in the above with reference to FIG. 7, it is possible to ensure an optimum opening ratio and to maximize external light protecting efficiency, when a lower end width d of the pattern unit 1210 is 18 μm to 35 μm, and thus, the lower end width d of the pattern unit 1210 is preferably set to be 3.6 to 17.5 times greater than a depth a of a groove formed in the lower end of the pattern unit 1210.

Meanwhile, it is possible to form a gradient of the slanted surface capable of optimizing the absorption of external light and the reflection of light emitted from the PDP, when a height c of the pattern unit 1210 is 80 μm to 170 μm, and thus, the height c of the pattern unit 1210 is preferably set to be 16 to 85 times greater than the depth a of the groove formed in the lower end of the pattern unit 1210.

Also, the thickness b of the sheet for protecting external light is preferably set to be 20 to 90 times greater than the depth a of the groove formed in the lower end of the pattern unit 1210, because it is possible to obtain the appropriate transmittance of light emitted from the PDP, the absorption and the protecting as well as the durability of the sheet for protecting external light when the thickness b of the sheet for protecting external light is 100 μm to 180 μm.

Figure 25:
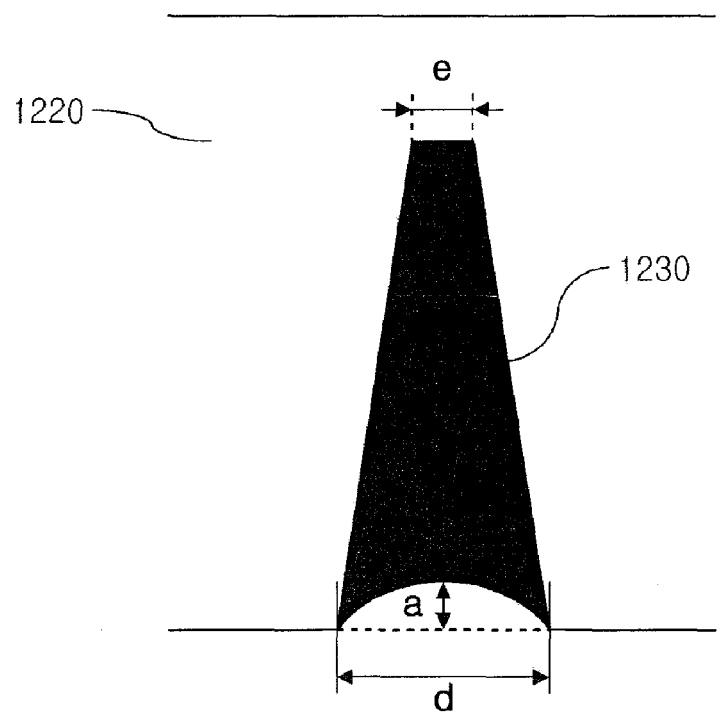

Referring to FIG. 25, the pattern unit 1230 may be trapezoidal, and in this case, the upper end width e of the pattern unit is preferably less than the lower end width d of the pattern unit. Also, when the upper end width e of the pattern unit 1230 is 10 μm or less, the slope of the slanted surfaces can be determined according to the relationship between the lower end width d so that the absorption of external light and the reflection of light emitted from the PDP can be optimized. In this case, the relationship between the upper end width e of the pattern unit 1230 and the lower end width d of the pattern unit 1230 may be the same as shown in FIG. 24.

Figure 26:
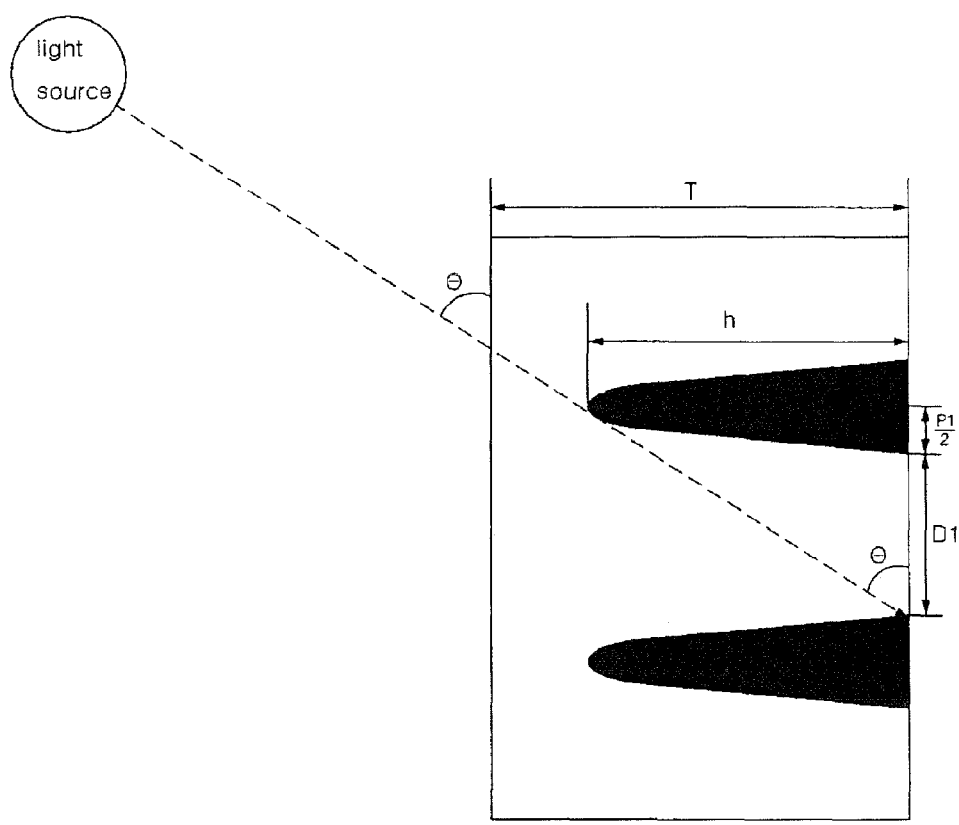
FIG. 26 is a cross-sectional view for explaining the relation between an interval of the adjacent pattern units formed on the sheet for protecting external light and a height of the pattern unit.

FIG. 26 is a cross-sectional view illustrating a structure of the sheet for protecting external light to explain the relation between the thickness of the sheet for protecting external light and the height of the pattern unit.

Referring to FIG. 26, the thickness T of the sheet for protecting external light is preferably set to 100 μm to 180 μm in order to obtain appropriate transmittance ratio of visible light emitted from the PDP for displaying images as well as to enhance the durability of the sheet for protecting external light including the pattern unit.

When the height h of the pattern unit provided in the sheet for protecting external light is 80 μm to 170 μm, the manufacture of the pattern unit can be facilitated, the optimum opening ratio of the sheet for protecting external light can be obtained, and the function of protecting external light and the function of reflecting light emitted from the PDP can be maximized.

The height h of the pattern unit can be varied according to the thickness T of the sheet for protecting external light. In general, external light that considerably affects the bright room contrast of the PDP is highly likely to be incident upon the PDP from the above. Therefore, in order to effectively protect external light incident upon the PDP at an angle θ within a predetermined range, the height h of the pattern unit is preferably within a predetermined percentage of the thickness T of the sheet for protecting external light.

As the height h of the pattern unit increases, the thickness of the base unit, which is the upper end region of the pattern unit, decreases, and thus, dielectric breakdown may occur. On the other hand, as the height h of the pattern unit decreases, more external light is likely to be incident upon the PDP at various angles within a predetermined range, and thus the sheet for protecting external light may not properly protect the external light.

Table 2 presents experimental results about the dielectric breakdown and the external light protecting effect of the sheet for protecting external light according to the thickness T of the sheet for protecting external light and the height h of the pattern unit.

TABLE 2

| Thickness (T) of sheet for protecting external light | Height (h) of pattern unit | Dielectric breakdown | External light protecting |
|---|---|---|---|
| 120 μm | 120 μm | ◯ | ◯ |
| 120 μm | 115 μm | Δ | ◯ |
| 120 μm | 110 μm | X | ◯ |
| 120 μm | 105 μm | X | ◯ |
| 120 μm | 100 μm | X | ◯ |
| 120 μm | 95 μm | X | ◯ |
| 120 μm | 90 μm | X | ◯ |
| 120 μm | 85 μm | X | Δ |
| 120 μm | 80 μm | X | Δ |

TABLE 2-continued

| Thickness (T) of sheet for protecting external light | Height (h) of pattern unit | Dielectric breakdown | External light protecting |
|---|---|---|---|
| 120 μm | 75 μm | X | Δ |
| 120 μm | 70 μm | X | Δ |
| 120 μm | 65 μm | X | Δ |
| 120 μm | 60 μm | X | Δ |
| 120 μm | 55 μm | X | Δ |
| 120 μm | 50 μm | X | X |

Referring to Table 2, when the thickness T of the sheet for protecting external light is 120 μm or more, and the height h of the pattern unit is 115 μm or more, the pattern unit are highly likely to dielectric breakdown, thereby increasing defect rates of the product. When the height h of the pattern unit is 115 μm or less, the pattern unit is less likely to dielectric breakdown, thereby reducing defect rates of the sheet for protecting external light. However, when the height h of the pattern unit is 85 μm or less, the protecting efficiency of external light may be reduced, and when the height h of the pattern unit is 60 μm or less, external light is likely to be directly incident upon the PDP. Therefore, when the height h of the pattern unit is 90 μm to 110 μm, the protecting efficiency of the sheet for protecting external light may be increased as well as the defect rates of the sheet for protecting external light may be decreased.

In addition, when the thickness T of the sheet for protecting external light is 1.01 to 2.25 times greater than the height h of the pattern unit, it is possible to prevent the upper end portion of the pattern unit 1210 from dielectrically breaking down and to prevent external light from being incident upon the PDP. Also, in order to prevent dielectric breakdown and infiltration of external light into the PDP, to increase the reflection of light emitted from the PDP, and to secure optimum viewing angles, the thickness T of the sheet for protecting external light may be 1.01 to 1.5 times greater than the height h of the pattern unit.

Table 3 presents experimental results about the occurrence of the moire phenomenon and the external light protecting effect of the sheet for protecting external light according to different pattern unit lower end width of the sheet for protecting external light-to-bus electrode width ratios, formed on the upper substrate of the PDP, when the width of the bus electrode is 70 μm.

TABLE 2

| Lower end width of pattern unit/Width of bus electrode | Moire | External light protecting |
|---|---|---|
| 0.10 | Δ | X |
| 0.15 | Δ | X |
| 0.20 | X | Δ |
| 0.25 | X | ○ |
| 0.30 | X | ○ |
| 0.35 | X | ○ |
| 0.40 | X | ○ |
| 0.45 | Δ | ○ |
| 0.50 | Δ | ○ |
| 0.55 | ○ | ○ |
| 0.60 | ○ | ○ |

Referring to Table 3, when the lower end width of the pattern unit is 0.2 to 0.5 times greater than the bus electrode width, the moire phenomenon can be reduced as well as external light incident upon the PDP can be reduced. Also, in order to prevent the moire phenomenon, to effectively protect external light, and to secure a sufficient opening ratio for discharging light emitted from the PDP, the lower end width of the pattern unit is preferably 0.25 to 0.4 times greater than the bus electrode width.

Table 4 presents experimental results about the occurrence of the moire phenomenon and the external light protecting effect according to different pattern unit lower end width of the sheet for protecting external light-to-vertical barrier rib width ratios, formed on the lower substrate of the PDP, when the width of the vertical barrier rib is 50 μm.

TABLE 4

| Lower end widths of pattern unit/Upper end width of vertical barrier rib | Moire | External light protecting |
|---|---|---|
| 0.10 | ○ | X |
| 0.15 | Δ | X |
| 0.20 | Δ | X |
| 0.25 | Δ | X |
| 0.30 | X | Δ |
| 0.35 | X | Δ |
| 0.40 | X | ○ |
| 0.45 | X | ○ |
| 0.50 | X | ○ |
| 0.55 | X | ○ |
| 0.60 | X | ○ |
| 0.65 | X | ○ |
| 0.70 | Δ | ○ |
| 0.75 | Δ | ○ |
| 0.80 | Δ | ○ |
| 0.85 | ○ | ○ |
| 0.90 | ○ | ○ |

Referring to Table 4, when the lower end width of the pattern unit is 0.3 to 0.8 times greater than the upper end width of the vertical barrier rib, the moire phenomenon can be reduced as well as external light incident upon the PDP can be reduced. Also, in order to prevent the moire phenomenon, to effectively protect external light, and to secure a sufficient opening ratio for discharging light emitted from the PDP, the lower end width of the pattern unit is preferably 0.4 to 0.65 times greater than the upper end width of the vertical barrier rib.

FIGS. 27 to 30 are cross-sectional views illustrating a structure of a filter according to embodiments of the present invention. The filter formed at a front of the PDP may include an anti-reflection (AR)/near infrared (NIR) shielding sheet, an electromagnetic interference (EMI) sheet, a sheet for protecting external light and an optical sheet, etc.

Figure 27:
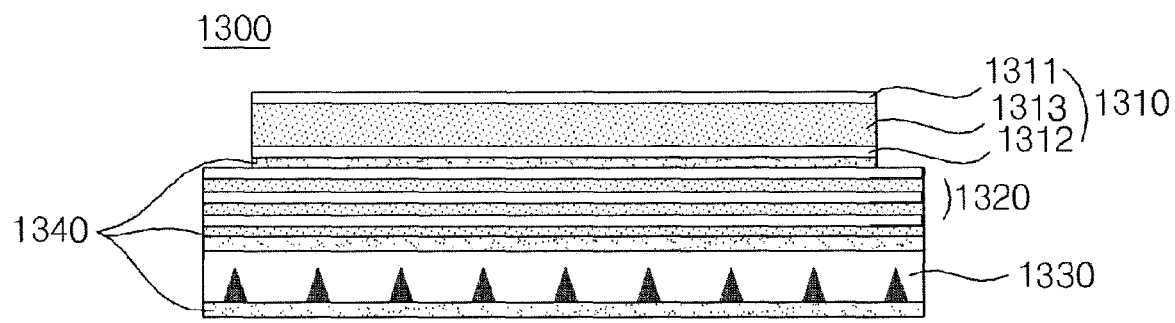
FIGS. 27 to 30 are cross-sectional views illustrating a structure of a filter having the sheet for protecting external light according to embodiments of the present invention.
Figure 28:
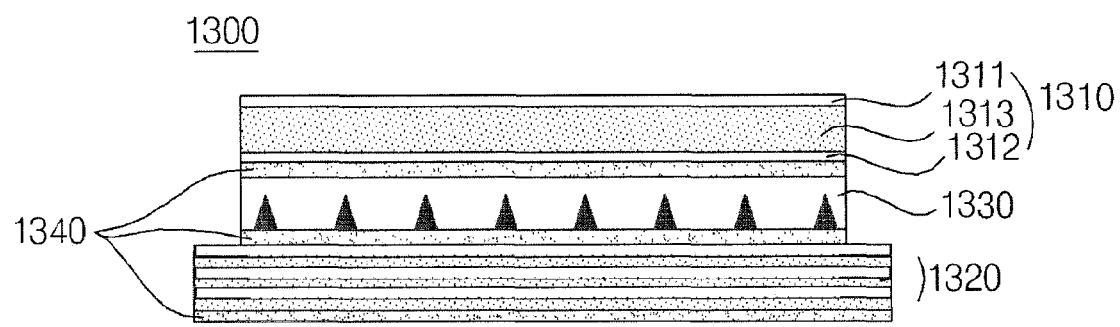

Referring to FIGS. 27 and 28, an anti-reflection (AR) layer 1311 which is attached onto a front surface of the base sheet 1313 and reduces glare by preventing the reflection of external light from the outside is attached onto the AR/NIR shielding sheet 1310, and a near infrared (NIR) shielding layer 1312 which shields NIR rays emitted from the PDP so that signals provided by a device such as a remote control which transmits signals using infrared rays can be normally transmitted is attached onto a rear surface of the AR/NIR sheet. The electromagnetic interference (EMI) sheet 1320 is a sheet that prevents electromagnetic interference (EMI) emitted from the PDP from being released to the outside. In the present invention, the electromagnetic interference (EMI) sheet 1320 has a structure where at least three thin film layers formed in a sputtering method are stacked.

The sputtering method is the technique attaching a layer to a surface after ejecting metal molecules by colliding inert elements such as argon, etc., against a metal plate, one of manufacturing methods of a thin film layer. If direct current power is applied to a target while flowing argon (Ar) gas, which is an inert material, into a chamber remained with vacuum as sputtering gas, plasma occurs between a substrate intending to deposit and the target. In other words, the argon gas is ionized into a positive ion and it is accelerated into a cathode by means of a DC ammeter to be collided with the surface of the target so that the elements of the target material escapes from the surface to form a thin film layer on the substrate.

As described above, if the EMI shielding sheet is formed in the sputtering method, the moire phenomenon can be remarkably reduced than an EMI shielding sheet in a mesh form. In other words, although the moire phenomenon, which is a phenomenon generated by means of a regular repetition of a predetermined pattern, becomes a cause to degrade an image quality, the pattern is not formed in the EMI shielding sheet formed in a sputtering method as shown in the present invention so that the moire phenomenon does not occur.

At least three thin film layers in such an EMI shielding sheet of the present invention includes a dielectric layer, a protective layer and a metal layer. The stacking order of each layer is not restricted to the drawing and at least three thin film layers as shown above can be stacked by being repeated in a set at least once.

In general, an external light source is mostly located over the head of a viewer regardless of an indoor or outdoor environment. The sheet for protecting external light 1330 is attached thereto so that external light is effectively protected and thus black images of the PDP can be rendered even blacker.

An adhesive layer 1340 is interposed between the AR/NIR sheet 1310, the electromagnetic interference (EMI) sheet 1320 and the sheet for protecting external light 1330, so that the sheets 1310, 1320, 1330 and the filter 1300 can be firmly attached onto the front surface of the PDP. Also, the base sheets interposed between the sheets 1310, 1320, 1330 are preferably made of the same material in order to facilitate the manufacture of the filter 1300.

Meanwhile, according to FIG. 27, the AR/NIR sheet 1310, the electromagnetic interference (EMI) sheet 1320, and the sheet for protecting external light 1330 are sequentially stacked. Alternatively, the AR/NIR sheet 1310, the sheet for protecting external light 1330 and the electromagnetic interference (EMI) sheet 1320 may be sequentially stacked, as shown in FIG. 28. The order in which the AR/NIR sheet 1310, the electromagnetic interference (EMI) sheet 1320 and the sheet for protecting external light 1330 are stacked is not restricted to those set forth herein. Also, at least one layer of the illustrated sheets 1310, 1320, 1330 may be omitted.

Figure 29:
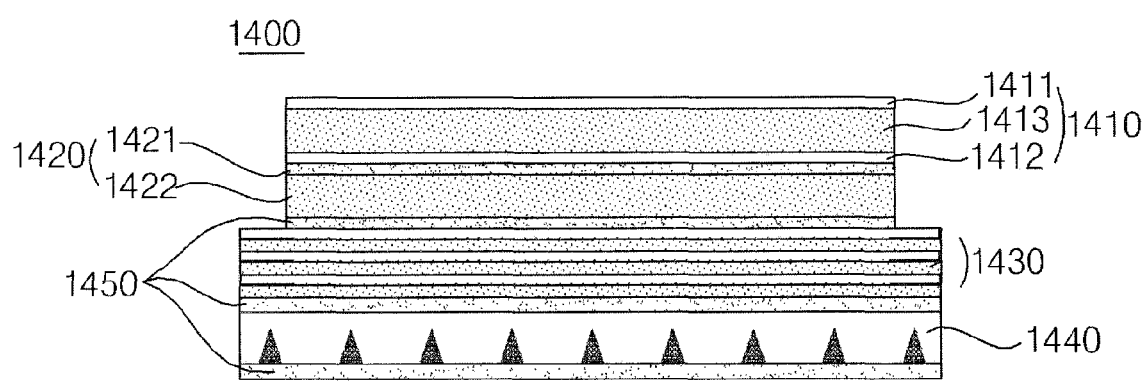
Figure 30:
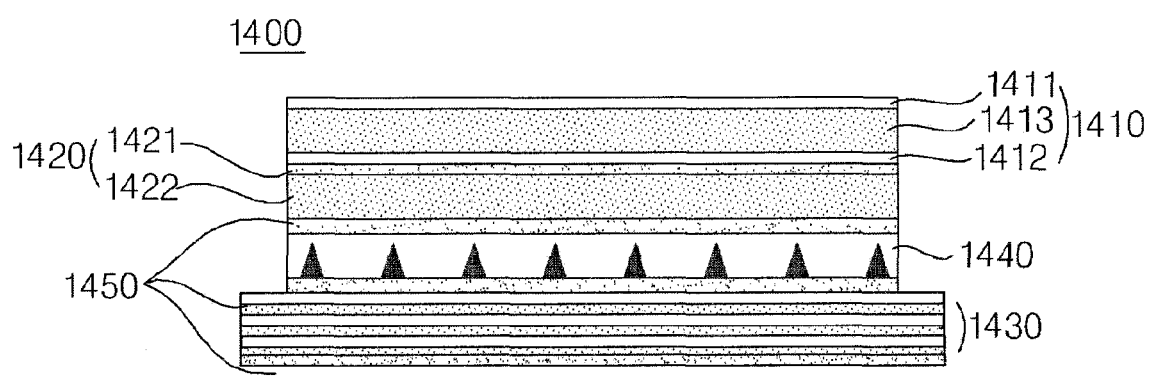

Referring to FIGS. 29 and 30, a filter 1400 disposed at the front surface of the PDP may further include an optical sheet 1420 as well as an AR/NIR sheet 1410, an electromagnetic interference (EMI) sheet 1430 and a sheet for protecting external light 1440. The optical sheet 1420 enhances the color temperature and luminance properties of light from the PDP, and an optical sheet layer 1421 which is formed of a dye and an adhesive is stacked on a front or rear surface of the base sheet 1422 which is formed of a transparent plastic material.

At least one of the base sheets shown in FIGS. 27 to 30 may be abbreviated, and at least one of the base sheets may be formed of a hard glass instead of being formed of a plastic material, so that the protection of the PDP can be enhanced. It is preferable that the glass is formed at a predetermined spacing apart from the PDP.

In addition, the filter according to the present invention may further include a diffusion sheet. The diffusion sheet serves to diffuse light incident upon the PDP to maintain the uniform brightness. Therefore, the diffusion sheet may widen the vertical viewing angle and conceal the patterns formed on the sheet for protecting external light by uniformly diffusing light emitted from the PDP. Also, the diffusion sheet may enhance the front luminance as well as antistatic property by concentrating light in the direction corresponding to the vertical viewing angle.

A transmissive diffusion film or a reflective diffusion film can be used as a diffusion sheet. In general, the diffusion sheet may have the mixed form that small glass particles are mixed in the base sheet of polymer material. Also, PMMA may be used as a base sheet of the diffusion film. When PMMA is used as a base sheet of the diffusion film, it can be used in large display devices because thermal resistance of the base sheet is good enough despite of its thick thickness.

Figure 31:
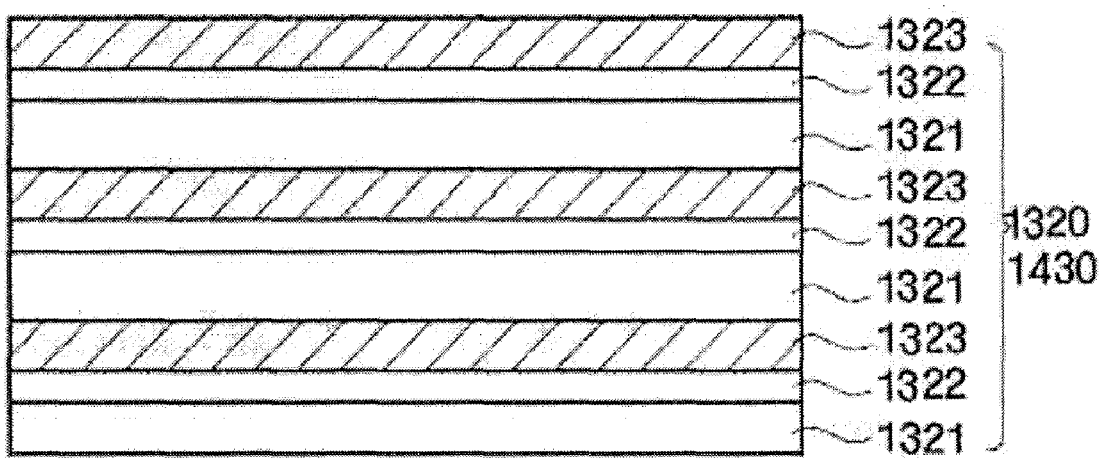
FIGS. 31 and 32 are cross-sectional views illustrating a structure of EMI shielding sheets according to embodiments of the present invention.
Figure 32:
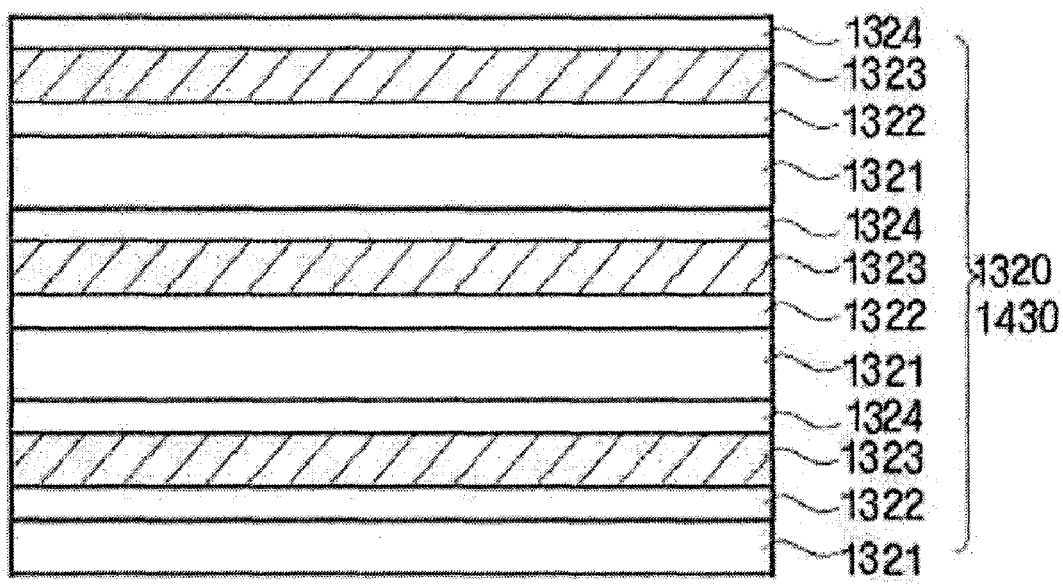

FIGS. 31 and 32 are cross-sectional views illustrating a structure of the EMI shielding sheets 1320 and 1430 according to embodiments of the present invention, wherein they show embodiments having a different stacking order in a structure including at least three thin film layers proposed in the description of FIG. 27.

Reviewing each layer in detail, first the dielectric layer 1321 is constituted by containing $Nb_2O_5$. Of course, any other element components such as Ti, Cr, or Zr may also be contained.

The thickness of the dielectric layer 1321 may be set to 50 nm to 70 nm, and in particular, the thickness thereof is preferably set to be thin in the case of a dielectric layer adjacent a front substrate. This is the reason that as the thickness of the dielectric layer is the most adjacent the substrate, it reduces reflectivity of visible rays and increases wavelength range capable of obtaining low reflectivity.

A protective layer 1322 containing ZnO or ITO as a main component is formed on the dielectric layer 1321. The protective layer enhances durability by protecting a metal layer 1323 for shielding the EMI and at the same time, enhances electromagnetic wave shielding performance by improving electrical conductivity shown by means of the metal layer.

In addition, the protective layer 1322 suppresses surface plasmons generated in the interface between the metal layer 1323 and the didelectric layer 1321 from forming to reduce loss of visible rays generated due to light absorption by means of the plasmons. At the same time, it reduces the reflectivity of visible rays and serves to increase a wavelength band capable of obtaining the low reflectivity.

To this end, the thickness of the protective layer 1322 may be set to 60 nm to 80 nm and is formed by containing oxide (hereinafter, referred to as 'AZO'), wherein small amounts of Al or Al2O3 are contained in addition to ZnO.

A metal layer 1323 with electrical conductivity is formed on the protective layer 1322, wherein it is mainly made of Ag that is soft and has excellent electrical conductivity, maintaining electrically conductivity even in formed in a thin film, or alloy containing the Ag of 90 or more. Also, Ag has advantages that it is cheap and is easy to obtain a transparent thin film due to less absorption of visible rays as compared to another metal.

The thickness of the metal layer 1323 may be set to 80 nm to 105 nm. Based on the same reason as the dielectric layer 1321, the metal layer the most adjacent the substrate is preferably set to be thinner as compared to the thickness of another metal layer. This is the reason that the reflectivity of visible rays is reduced and the wavelength band capable of obtaining low reflectivity is increased.

As described above, the EMI shielding sheets 1321 and 1430 in the embodiment of FIG. 31 has a structure where the dielectric layer 1321, the protective layer 1322 and the metal layer 1323 are sequentially stacked and shows the case where the structure in one set is repeated three times, wherein the repeating number is not restricted to the drawing.

In the embodiment of FIG. 32, it is different that the thin film layers forming one set include the dielectric layer 1321, the protective layer 1322, the metal layer 1323 and the protective layer 1324, and the description for the constituents repeated other than these constituents will be replaced by the description for the embodiment of FIG. 31. Even though the description also describes that such a structure is repeated three times, the repeating number is not restricted to the drawing.

In other words, as the protective layers 1322 and 1424 are stacked on the upper portion and the lower portion of the metal layer 1323, respectively, in the embodiment as shown in FIG. 32, at least four thin film layers are included in one set. The reason why the protective layer 1324 is additionally stacked is that if a sputtering method is used for forming the dielectric layer after forming the metal layer 1323, the metal layer previously formed by means of plasma may be damaged. In order to prevent this, protective layers performing the function of blocker are arranged on the upper portion and the lower portion of the metal layer, respectively, making it possible to maintain electrical conductivity and accomplish desired electromagnetic wave shielding function.

According to the present invention, it is possible to effectively realize black images and enhance bright room contrast by arranging the sheet for protecting external light, which absorbs and protects external light from the outside, at the front of the display panel. At the same time, it is also possible to enhance electromagnetic wave shielding effect.

While the present invention has been particularly shown and described with reference to exemplary embodiments thereof, it will be understood by those of ordinary skill in the art that various changes in form and details may be made therein without departing from the spirit and scope of the present invention as defined by the following claims. It is, therefore, intended that such changes and modifications be covered by the following claims.

What is claimed is:

1. A plasma display device, including:
    a plasma display panel (PDP);
    an EMI shielding sheet, comprising a plurality of shielding layers, each of the plurality of shielding layers including a dielectric layer formed of an oxide material, a metal layer that shields electromagnetic waves, and a protective layer positioned on at least one of an upper surface or a lower surface of the metal layer so as to protect the metal layer, wherein the dielectric layer is thinner than both the metal layer and the protective layer, and the metal layer thicker than both the dielectric layer and the protective layer; and
    a refractive sheet that absorbs external light and transmits light emitted by the PDP, the refractive sheet comprising:
        a base unit having a plurality of grooves formed in a first surface thereof; and
        a plurality of pattern units provided within the plurality of grooves, wherein each of the plurality of pattern units includes a lower end that is positioned adjacent to the first surface of the base unit within a respective groove, and an upper end positioned in a bottom of the respective groove and oriented toward a second surface of the base unit opposite the first surface thereof, and wherein the lower ends of the plurality of pattern units are concave such that they extend into the plurality of grooves formed in the first surface of the base unit.

2. The plasma display device of claim 1, wherein the dielectric layer, the metal layer and the protective layer are formed in a stack by sputtering.

3. The plasma display device of claim 1, wherein a thickness of the EMI shielding sheet is between approximately 200μm and 300μm.

4. The plasma display device of claim 1, wherein a thickness of the protective layer is 1 to 1.5 times greater than a thickness of the dielectric layer.

5. The plasma display device of claim 1, wherein a thickness of the metal layer is 1.3 to 2 times greater than a thickness of the dielectric layer.

6. The plasma display device of claim 1, wherein layers positioned at at least one of an upper end or a lower end of the shielding layer are protective layers.

7. The plasma display device of claim 1, wherein a difference between the refractive index of the base unit and the refractive index of the plurality of pattern units is between approximately 0.05 and 0.3.

8. The plasma display device of claim 1, wherein the refractive index of the plurality of pattern units is 0.3 to 1 times less than the refractive index of the base unit.

9. The plasma display device of claim 1, wherein the refractive index of the plurality of pattern units is 1.0 to 1.3 times greater than the refractive index of the base unit.

10. The plasma display device of claim 1, wherein a width of the lower end of each of the plurality of pattern units is greater than its upper end, and wherein the upper ends of the plurality of pattern units are closer to the PDP than are the lower ends.

11. The plasma display device of claim 10, wherein the first surface of the base unit in which the plurality of grooves are formed faces the PDP such that the lower ends of the plurality of pattern units face the PDP, and the upper ends of the plurality of pattern units are closer to a second surface of the base unit than are the lower ends such that the upper ends of the plurality of pattern units are oriented toward an external side of the plasma display device.

12. The plasma display device of claim 1, wherein a thickness of the refractive sheet is 1.01 to 2.25 times a height of the plurality of pattern units.

13. The plasma display device of claim 1, wherein the plurality of grooves extend at an angle greater than zero with respect to an edge of the base unit.

14. The plasma display device of claim 13, wherein the plurality of grooves all extend in parallel to each other.

15. The plasma display device of claim 1, wherein a refractive index of the plurality of pattern units is different from that of the base unit.

16. A filter provided at a front surface of a plasma display device, the filter including:
    a dielectric layer formed of an oxide material;
    a metal layer that shields electromagnetic waves, wherein a thickness of the metal layer is 1.3 to 2 times greater than a thickness of the dielectric layer;
    an EMI shielding sheet comprising a plurality of shielding layers, each of the plurality of shielding layers including a protective layer positioned on at least one of an upper surface or a lower surface of the metal layer so as to protect the metal layer; and a refractive sheet that absorbs external light and transmits light emitted by a plasma display panel, the refractive sheet including a base unit having a plurality of grooves formed in a first surface thereof and a plurality of pattern units provided within each of the plurality of grooves of the base unit, wherein a refractive index of the plurality of grooves is different from that of the base unit, and wherein an exposed surface of each of the plurality of pattern units corresponding to the first surface thereof is concave so as to extend a respective groove.

17. The filter of claim 16, wherein a thickness of the protective layer is 1 to 1.5 times greater than a thickness of the dielectric layer.

18. The filter of claim 16, wherein a difference between the refractive index of the base unit and the refractive index of the plurality of pattern units is 0.05 to 0.3.

19. The filter of claim 16, wherein the refractive index of the plurality of pattern units is 0.3 to 1 times less than the refractive index of the base unit.

20. The filter of claim 16, wherein each of the plurality of pattern units includes an upper end and a lower end having a width that is greater than the upper end, wherein the upper ends of the plurality of pattern units are closer to the PDP than are the lower ends.

21. The filter of claim 16, wherein a thickness of the refractive sheet is 1.01 to 2.25 times a height of the pattern units.

22. A plasma display device, including:
a plasma display panel (PDP);
an EMI shielding sheet, comprising a plurality of shielding layers, each of the plurality of shielding layers including a dielectric layer, a metal layer and a protective layer provided on the metal layer; and
a refractive sheet that absorbs external light and transmits light emitted by the PDP, the refractive sheet comprising:
a base unit having a plurality of grooves formed in a first surface thereof; and
a plurality of pattern units formed inside the plurality of grooves of the base unit and having a different refractive index from that of the base unit, wherein a thickness of the metal layer is 1.3 to 2 times a thickness of the dielectric layer.

23. A plasma display device, including:
a plasma display panel (PDP);
an EMI shielding sheet, comprising a plurality of shielding layers, each of the plurality of shielding layers including a dielectric layer, a metal layer and a protective layer provided on the metal layer; and
a refractive sheet that absorbs external light and transmits light emitted by the PDP, the refractive sheet comprising:
a base unit having a plurality of grooves formed in a first surface thereof; and
a plurality of pattern units formed inside the plurality of grooves of the base unit and having a different refractive index from that of the base unit, wherein the dielectric layer is thinner than both the metal layer and the protective layer, and the metal layer thicker than both the dielectric layer and the protective layer.

24. A filter provided at a front surface of a plasma display device, the filter including:
a dielectric layer formed of an oxide material;
a metal layer that shields electromagnetic waves;
an EMI shielding sheet comprising a plurality of shielding layers, each of the plurality of shielding layers including a protective layer positioned on at least one of an upper surface or a lower surface of the metal layer so as to protect the metal layer; and
a refractive sheet that absorbs external light and transmits light emitted by a plasma display panel, the refractive sheet including:
a base unit having a plurality of grooves formed in one surface thereof; and
a plurality of pattern units provided within each of the plurality of grooves of the base unit, wherein a refractive index of the plurality of grooves is different from that of the base unit, and wherein a thickness of the metal layer is 1.3 to 2 times a thickness of the dielectric layer.

* * * * *